Nov. 19, 1963     A. G. VAN ALSTYNE ETAL     3,111,643
AIR TRAFFIC SCHEDULE MONITORING METHOD AND SYSTEM
Filed May 21, 1956     11 Sheets-Sheet 1
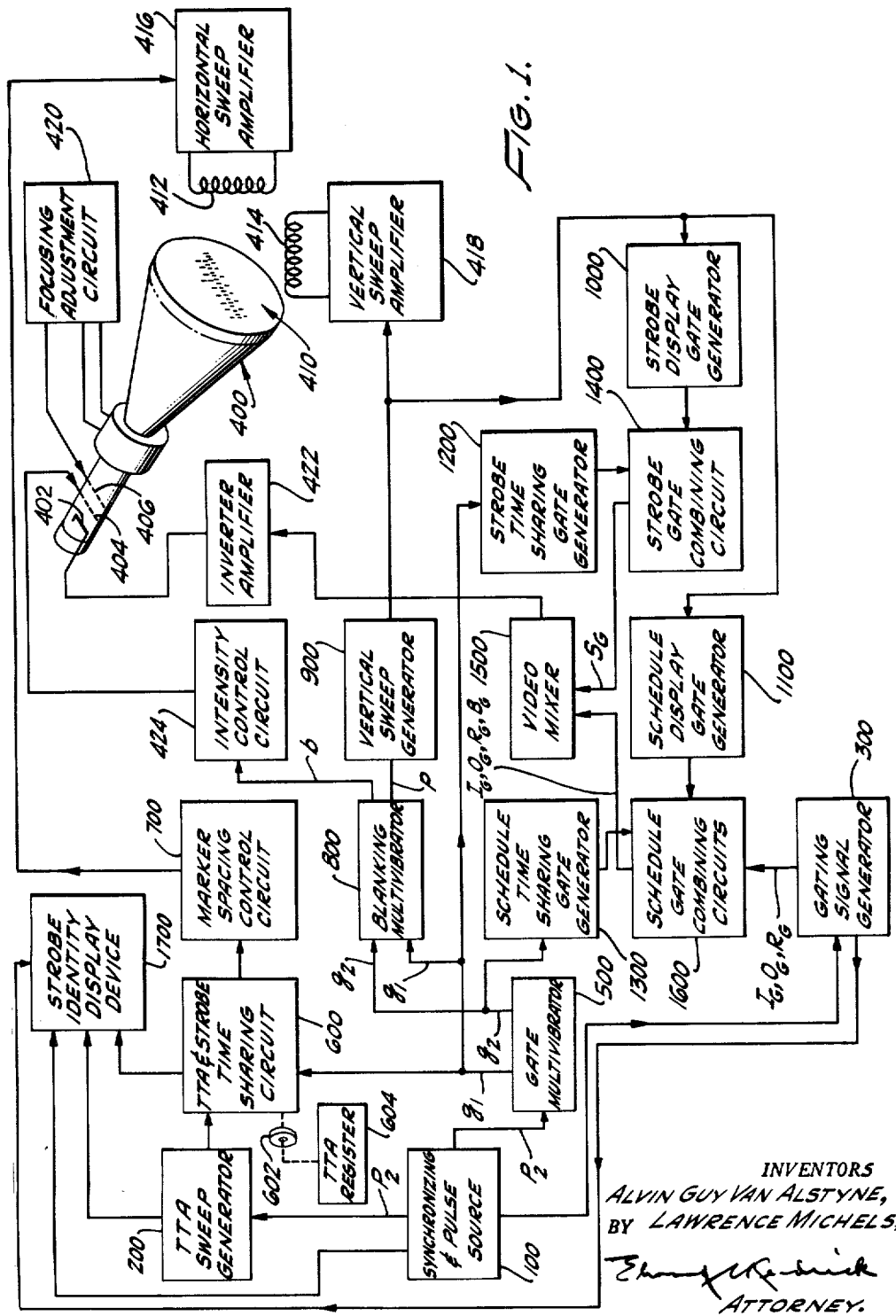
INVENTORS
ALVIN GUY VAN ALSTYNE,
BY LAWRENCE MICHELS,
ATTORNEY.

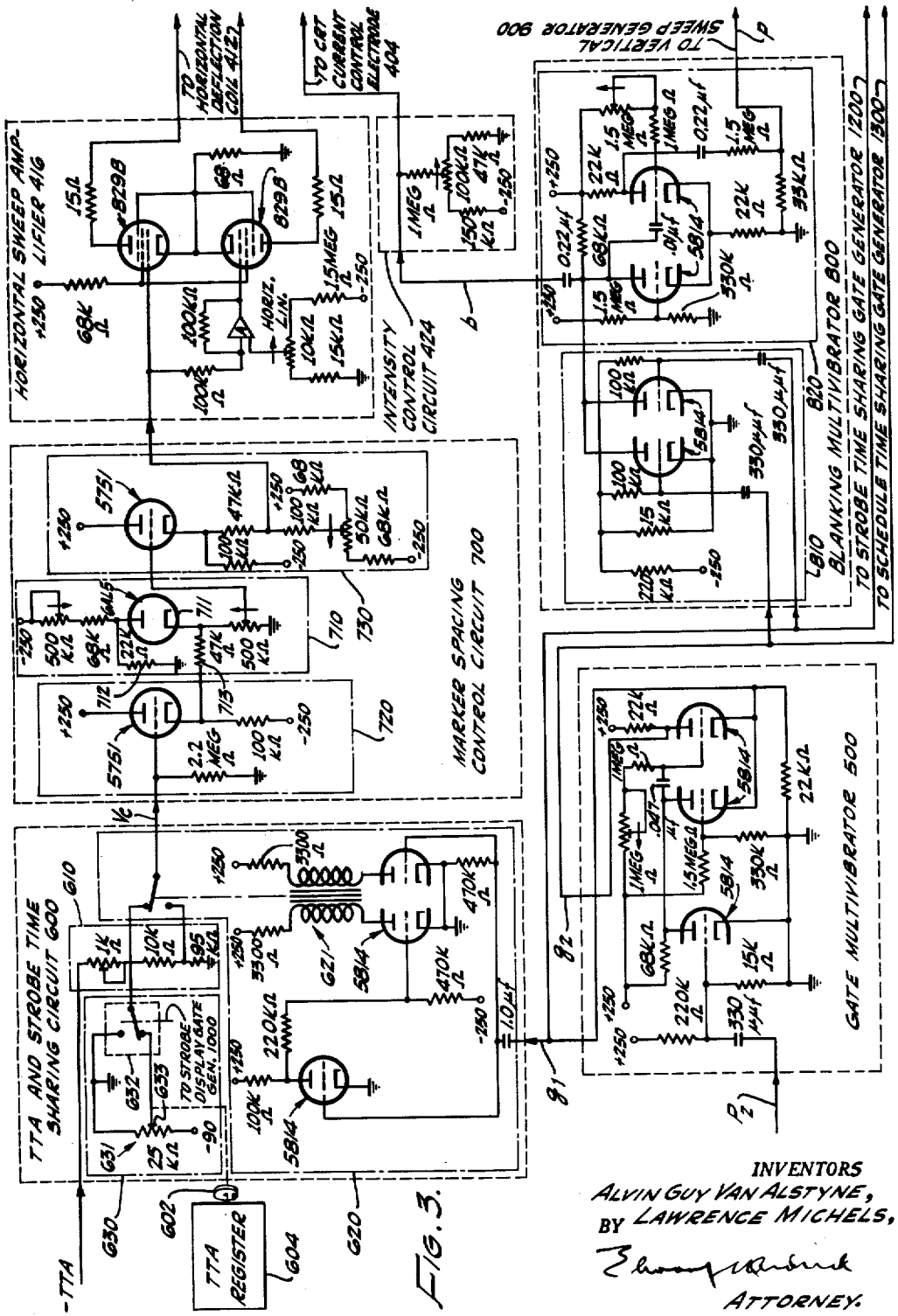

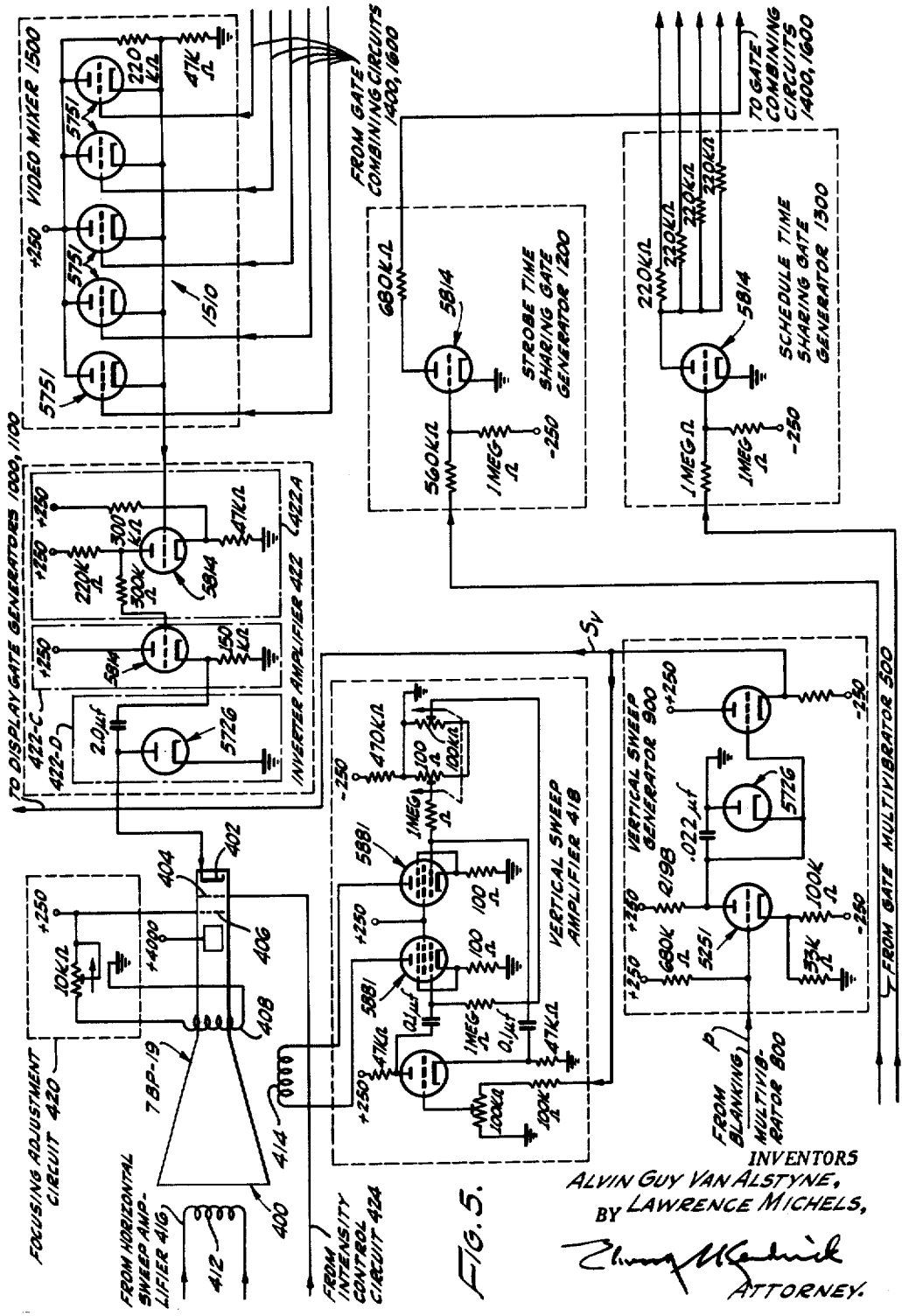

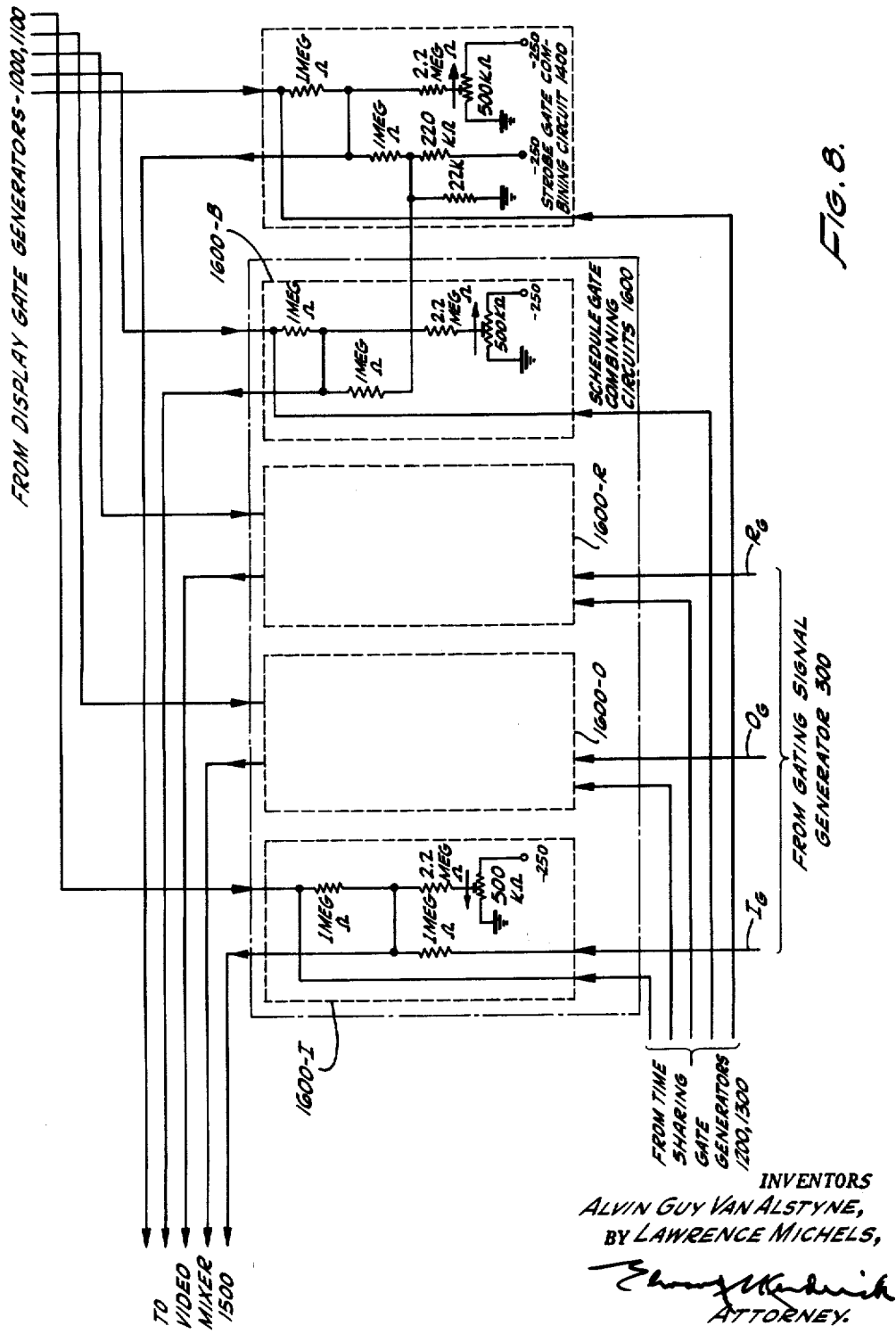

Nov. 19, 1963     A. G. VAN ALSTYNE ETAL     3,111,643
AIR TRAFFIC SCHEDULE MONITORING METHOD AND SYSTEM
Filed May 21, 1956     11 Sheets-Sheet 8
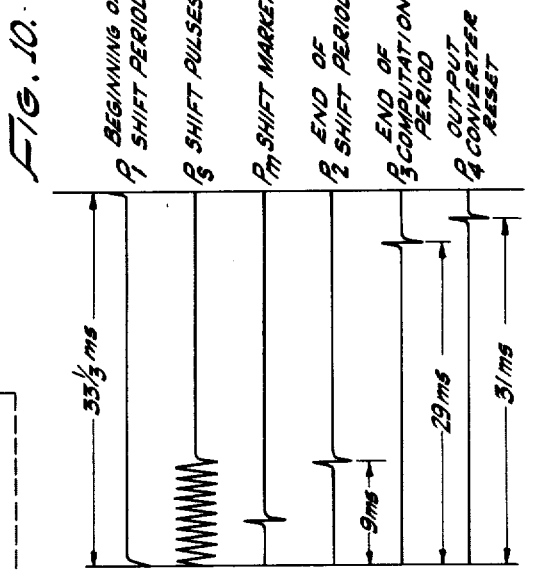
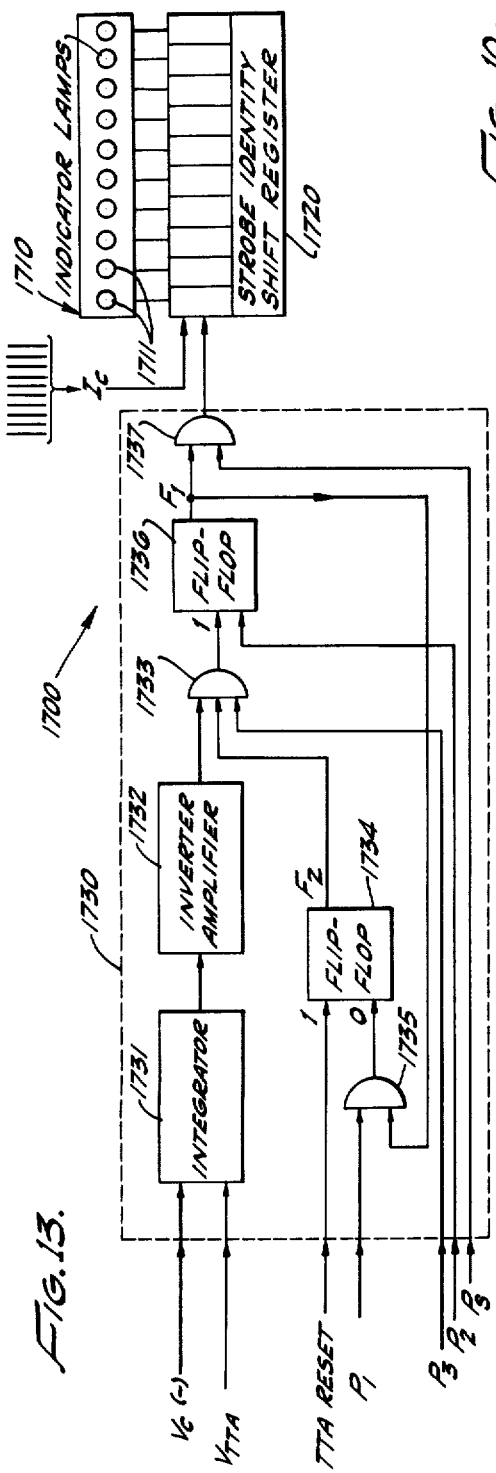
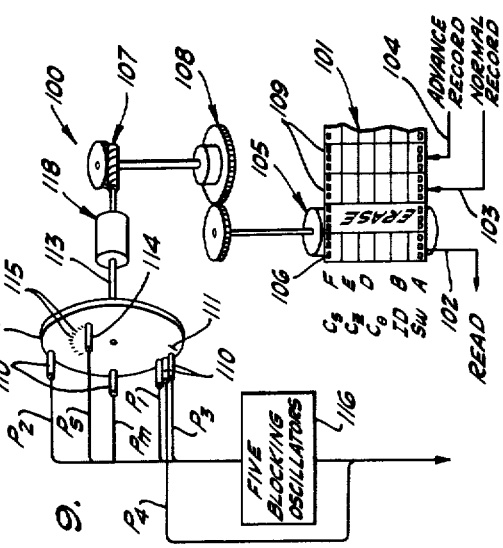
INVENTORS
*ALVIN GUY VAN ALSTYNE,*
BY *LAWRENCE MICHELS,*
ATTORNEY.

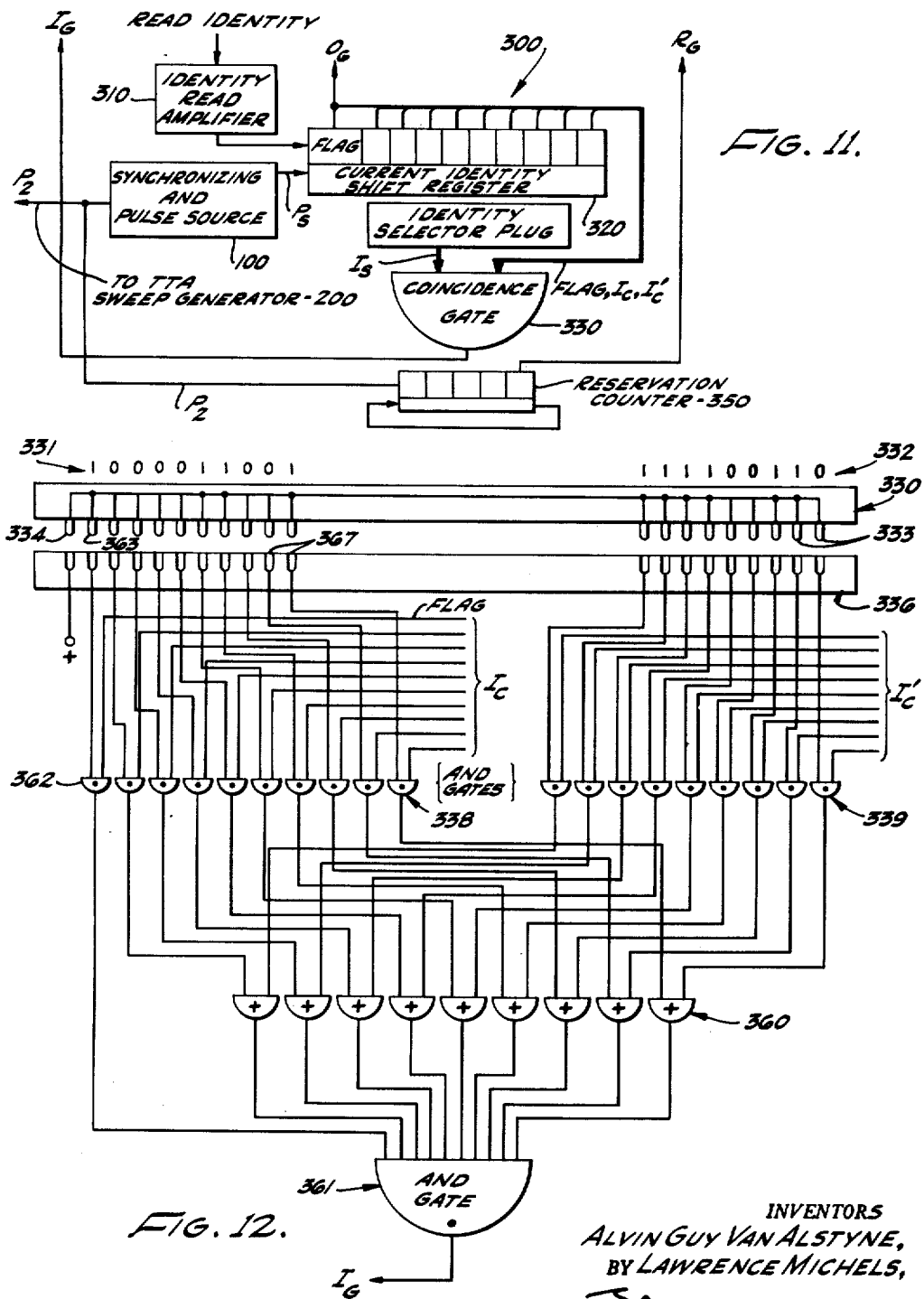

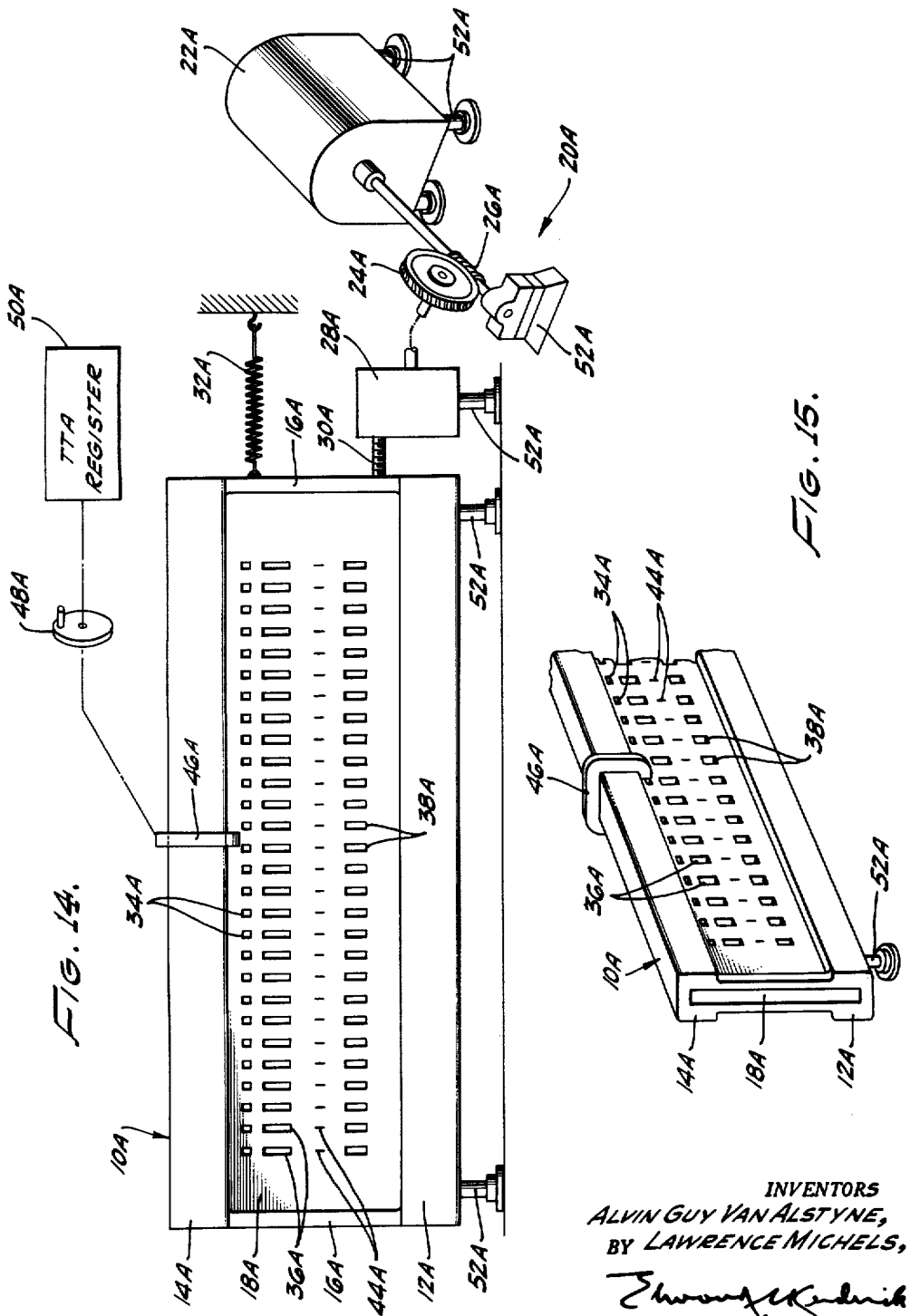

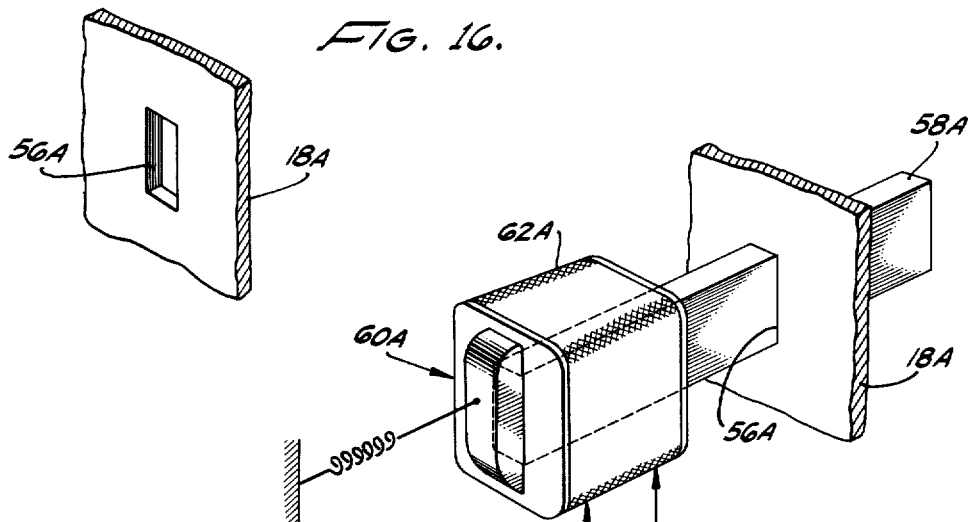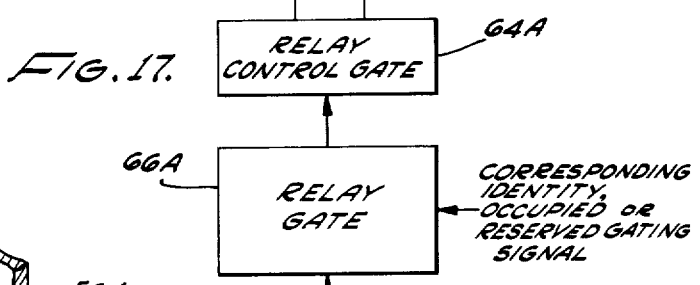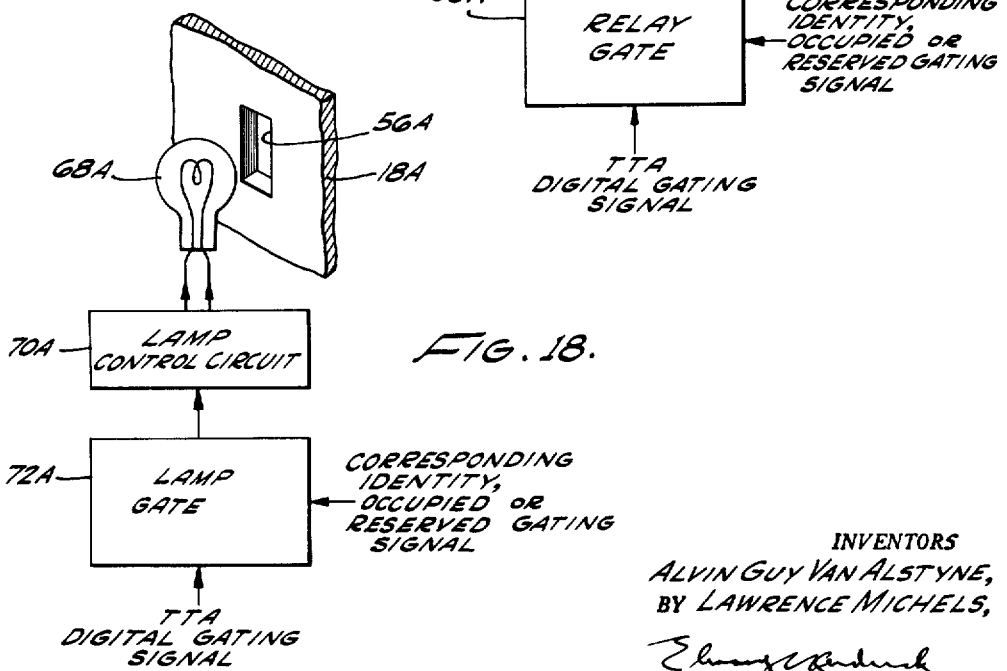

United States Patent Office 3,111,643
Patented Nov. 19, 1963

3,111,643
AIR TRAFFIC SCHEDULE MONITORING
METHOD AND SYSTEM
Alvin Guy Van Alstyne, Los Angeles, and Lawrence Michels, Inglewood, Calif., assignors to Gilfillan Bros., Inc., Los Angeles, Calif., a corporation of California
Filed May 21, 1956, Ser. No. 587,190
27 Claims. (Cl. 340—23)

This invention relates to display devices and more particularly to a monitoring device and method for use with an air traffic control system wherein a plurality of aircraft are successively directed to and through a landing system "entry gate" which may be, for example, an initial glidepath point or the point of initial radar detection of ground controlled approach (GCA) or other types of landing system situated at a landing station.

In an air traffic control system of this type a relatively large number of aircraft are assigned to predetermined time-to-arrival schedules and are directed through the entry gate at a rather rapid rate, e.g., they may be directed through the entry gate at thirty second intervals. Such a high landing rate requires that personnel of the landing station and pilots of the aircraft be informed continually of current traffic conditions in order that they may determine how to resolve existing landing problems.

Some of the ways in which the invention may be employed to display vital information about air traffic conditions may be better understood when considered in connection with a specific monitoring problem. One such problem arises when a landing station becomes unable to receive aircraft as rapidly as an associated air traffic control system can direct them to the station. For example, the station may be temporarily disabled by inadvertent mismanagement of landing procedures or by physical damage caused by the enemy in time of war. For this reason, at least some of the aircraft approaching the landing system entry gate must be reassigned new time-to-arrival schedules to arrive at a later time so that the landing station will be able to receive them. In determining whether or not schedule reassignment or holding should be initiated, two facts should obviously be known, viz. the density of traffic and the extent of the time over which existing traffic is actually relatively dense. This information is, of course, valueless if it is not known a reasonable length of time before relatively heavy traffic has arrived at the entry gate.

The method of the present invention solves this monitoring problem by displaying air traffic information in a unique manner. Specifically, the method includes the step of producing a plurality of occupied gate markers spaced a distance apart equal to different entry gate aircraft time-of-arrival intervals represented by each aircraft controlled by the traffic control system. The occupied gate markers may also be spaced from an indicium representing a known time-to-arrival schedule.

The present invention also solves the above-described air traffic control system monitoring problem by providing a combination of schedule display means for producing a plurality of occupied gate markers on a display device in positions representative of the entry gate time to arrival of aircraft being directed by the control system, and marker means for indicating the time-to-arrival of at least one of the occupied gate markers. It is easily seen that the proximity of the occupied gate markers will indicate the density of traffic and that the distance between the first and last occupied gate marks of a group will be proportional to the extent of time over which the group will be directed through the landing system entry gate. Depending upon the particular marker means employed with the invention, a monitor operator may thus determine either the approximate or the exact density and the overall landing time of an aircraft group approaching the entry gate.

In order for the monitoring device of the invention to perform its particular display function, this device is supplied with information from an air traffic control system. Specifically, a synchronizing pulse signal, a staircase reference signal representative of the entry gate times to arrival of all schedules maintained by the system, and one or more schedule gating signals are all applied in synchronism to the monitoring system of the invention. These signals are then used in a specific embodiment of the invention wherein the schedule display means includes means for generating an occupied display gate and an occupied gate combining circuit for passing the occupied display gate to gate the beam of a cathode-ray tube on and thereby to produce an occupied gate marker light when an occupied gating signal is received from the air traffic control system.

Alternatively a mechanical display system may be used with a plurality of markers shifted along an axis by a synchronous motor. For example, occupied gate markers may be lamp signaling means mounted on a guide plate or pins which are driven through an aperture in a guided mounting plate by the actuation of solenoids. The mounting plate would then be moved by the synchronous motor. Indicia may be additionally provided on stationary structure supporting the mounting plate to determine the times to arrival of aircraft represented by the occupied gate markers.

In accordance with another embodiment of the invention the marker means includes simply an etched groove or painted line on the luminescent screen of a cathode-ray tube based at a position equivalent to a known aircraft or schedule time to arrival. The density and landing period for a group of aircraft may thus be easily estimated.

Alternatively, the marker means of the invention may include means for producing stationary strobe gate line or marker disposed at a position proportional to a known schedule time to arrival, such as for example, where an aircraft time to arrival is zero. Such means are more specifically described hereinafter.

According to a feature of the invention the schedule display means and the marker means are respectively employed to produce occupied gate markers and baseline gate markers. The baseline gate markers are employed to represent each time-to-arrival schedule maintained by the associated air traffic control system. An aircraft is not normally assigned to each schedule displayed because this means that the control system is filled to capacity and this is not the usual case. The baseline gate markers will normally be displayed equal distances apart on the cathode-ray tube because all aircraft are normally guided to the landing system entry gate at regular intervals. For this reason, the use of the baseline gate markers with the occupied gate markers will permit a monitoring system operator to determine the actual traffic density of aircraft by comparing the baseline gate marker intervals to the occupied gate marker intervals. By knowing the difference in times to arrival represented by the distance between adjacent baseline gate markers, the operator may quickly approximate the entry gate time of arrival of the first aircraft of a dense group. When the baseline gate marker spacing interval is known, the operator may also easily approximate the extent of time the group will take to pass through the entry gate by counting the number of baseline gate markers contained between the first and last occupied gate markers of the group.

One advantage of the invention includes the use of the schedule display means and the marker means respectively to produce occupied gate markers and a strobe gate marker alternately on a cathode-ray tube luminescent screen on a time shared basis. For this reason the schedule display means is provided with means for generating an occupied display gate to gate the cathode-ray tube beam on and means for generating a schedule time sharing gate. In this embodiment of the invention the schedule display means also includes an occupied gate combining circuit which passes the occupied display gate to the cathode-ray tube when both the schedule time sharing gate and an occupied gating signal, produced by the control system, are impressed upon it. The marker means includes means for generating a strobe display gate and a strobe time sharing gate. Similarly, the strobe display gate is passed by a strobe gate comparison circuit when a strobe time sharing gate is impressed upon it, the strobe display gate being employed to gate the cathode-ray tube on.

In accordance with the preferred arrangement, the position of the strobe gate marker may be adjusted by manually operable means having a time-to-arrival register mechanically connected to it, the register indicating the time to arrival proportional to the position of a strobe gate marker. The strobe gate marker may thus be moved into line with the first aircraft of a group scheduled to arrive at the entry gate and the time-to-arrival register may be read. This reading may then be communicated to the landing station so that the station may know exactly when to prepare to receive a dense group of aircraft. It is obvious that this information may be very valuable even though the landing station does not happen to be disabled.

An alternative electro-mechanical system may also be devised by providing a movable indicium calibrated to read in time to arrival.

Another specific air traffic monitoring problem arises when an aircraft is assigned a priority for an advanced time-to-arrival schedule because the aircraft is low on fuel or is damaged, or because the aircraft contains an injured pilot. In such a case it is desirable to notify the aircraft landing station of the entry gate time to arrival of the priority aircraft in order that the landing station may properly prepare to receive it, i.e. so ambulance or wrecking crews may be alerted.

Another air traffic monitoring problem also occurs when a pilot of an identified aircraft needs to know his own time to arrival in order to determine whether or not he has enough fuel to land. In the event that he does not have sufficient fuel, he may be assigned an advanced time-to-arrival schedule.

The problem of determining the time-to-arrival of an identified priority aircraft is solved in a specific embodiment of the present invention wherein adjustable means are provided to produce a strobe gate marker at any selected position on a cathode-ray tube and second means are provided to produce a plurality of occupied gate markers. With each of these means, third means are combined to produce at least one identity gate marker. Means for producing the identity gate marker may be similar to the means employed to produce the occupied gate markers. However, a special air traffic control system identity gating signal is also used with the third means. This gating signal is produced by inserting a pre-wired plug into the system. This identity gating signal is then applied to an identity gate combining circuit with the schedule time sharing gate, which was previously explained, to pass a corresponding identity display gate which may be generated in the same manner as the occupied display gate. The identity display gate is then applied to the monitoring system cathode-ray tube to produce the identity gate marker. The identity gate marker is used in conjunction with a particular one of the occupied gate markers to distinguish it from the others. The identity gate marker for this reason is generally positioned in line with and immediately adjacent to the occupied gate marker identified. To find the time to arrival of an identified aircraft, the strobe gate marker is moved in line with the identified occupied gate marker and the time to arrival is read from the strobe time to arrival register. This reading is then the exact time to arrival of the aircraft identified.

The electro-mechanical analogy of this system is easily seen and will be explained in detail hereinafter.

In accordance with this same embodiment of the invention novel means are provided to produce an identity gating signal at a time-to-arrival cathode-ray tube sweep time corresponding to the identity of a selected aircraft. Specifically, a pre-wired identity selector plug is chosen which corresponds to the identity of a selected aircraft. This plug is inserted in a system panel to apply a first potential to a selected number of lead wires corresponding to a number, e.g., a binary number, and its complement, the remaining lead wires are then maintained at a second or different potential which may be ground. A current identity shift register, having lead wires with potentials indicating the binary number and complement of the current identity of a particular aircraft is then connected to a coincidence gate when the selector plug and the current identity shift register exhibit the same identities. The output of the coincidence gate is then the identity gating signal. An identity number is inserted into current identity shift register in a system shift period that immediately precedes each staircase step of the horizontal sweep reference signal. The cathode-ray tube horizontal sweep voltage thus is maintained in synchronism with the current identity shift register and the identity gating signal is produced at a sweep time which coincides with the time to arrival of the aircraft, the identity of which is determined by the identity selector plug.

The problem of determining the time-to-arrival of an identified aircraft may also be solved with the monitoring system of the invention by employing means to display three types of markers viz. the occupied gate markers, the identity gate marker and the baseline gate markers. By estimating the number of baseline gate markers from the zero time-to-arrival point on the cathode-ray tube employed, and multiplying this number by the equivalent time-to-arrival difference between adjacent baseline gate markers, the time to arrival of the identified aircraft may easily and quickly by approximated.

Further air traffic control system monitoring problems are presented in the procedure of handling priority aircraft and in the procedure of re-scheduling aircraft which have passed through the landing system and which have been unable to land for lack of a proper approach or for some other reason. Such aircraft may be called "wave-off" aircraft since they are actually waved off. A typical air traffic control system provides for wave-off and priority re-scheduling by regularly reserving certain time-to-arrival schedules. However, under certain conditions it may be desirable for an aircraft pilot to be informed of the time to arrival of the particular schedule to which he may expect to be assigned. For example, he may want to estimate the fuel he may need for a particular time-to-arrival schedule.

An operator of the monitoring system of the present invention may provide a pilot with reserve schedule time-to-arrival information which means are provided to display the baseline and occupied gate markers with means to display a plurality of reserved gate markers. In a specific embodiment of the invention employing a cathode-ray tube indicator, the reserved gate marker means may include means for generating a reserved gate and a reserved gate combining circuit for passing the reserved gate to the cathode-ray tube upon receiving both the schedule time sharing gate from the schedule time sharing gate generator and a reserved gating signal from the associated air traffic control system. It is desirable to use the baseline gate markers to calculate the approximate time to arrival of the reserved schedule to be assigned to a priority or wave-off aircraft in order to notify the aircraft pilot of this time to arrival. It will generally also be desirable to use the occupied gate markers to determine the time-to-arrival of the unoccupied reserved schedule closest to the entry gate because the earliest reserved schedules are generally preferred and because early reserved schedules are often occupied. This is true even though provision may be made for evicting a non-priority aircraft occupying a reserved schedule when an aircraft having a special priority must be landed.

The invention also contemplates the use of a strobe gate marker which may be used with occupied and reserved gate markers on a cathode-ray tube to determine exactly the time to arrival of an unoccupied reserve schedule for the above outlined purposes. This is accomplished simply by aligning the strobe gate marker with the reserved gate marker and reading the time-to-arrival register. In order to align the strobe gate marker more easily, it may be desirable to include the baseline gate markers because the reserve gate marker may be disposed below the occupied gate markers and the strobe gate marker may be disposed above the occupied gate markers. In this case a gap is left between the reserved gate marker and the strobe gate marker.

According to a specific aspect of the invention, a double sawtooth sweep voltage is generated for each air traffic control system synchronizing pulse. The sawtooth voltage is then applied to a vertical sweep circuit provided for the cathode-ray tube indicator of the invention. This double sawtooth voltage, however, is employed in a dual capacity, viz., it is additionally employed to drive the strobe and schedule display gate generators.

According to another variation of the invention the display gate generators employed therein incorporate a novel apparatus combination for producing a variable time width display gate from a sawtooth voltage. The time width of the gate may, in fact, be varied from a relatively small value to a value equal to the entire rise time of the sawtooth driving voltage.

An added feature of the invention relates to the use of a strobe identity shift register connected to a plurality of panel lights to indicate the identity of an aircraft having a time to arrival approximately equal to or next greater than that proportional to the strobe marker position. This identity is thus displayed as a binary number. The identity is shifted serially into the strobe shift register from the current identity shift register, but only according to certain logic which includes the condition that shift pulses must be gated into the strobe register only once in the error signal computation period of all schedules maintained by the system.

It is therefore an object of the invention to provide a monitoring method of and device for displaying traffic conditions existing in an air traffic control system.

It is a more specific object of the invention to provide means for determining the density and extent of a relatively dense group of aircraft approaching a landing station.

It is another object of the invention to provide means whereby the scheduled entry gate time to arrival of an identified aircraft in an air traffic control system may be easily and quickly determined.

Yet another object of the invention is to provide novel gating means to produce an identity gating signal at a cathode-ray tube sweep time corresponding to the identity of a particular and selected aircraft in an air traffic control system.

It is still another object of the invention to provide means whereby the time to arrival of an unoccupied reserved schedule in an air traffic control system may be easily and quickly approximated.

It is a further object of the invention to provide means for generating a sawtooth sweep voltage for a cathode-ray tube indicator and a selected display gate therefrom for simultaneously controlling the tube beam intensity.

It is a still further object of the invention to provide means for generating a variable width display gate from a driving sawtooth voltage.

Another object of the invention is to provide means for displaying the identity of an aircraft having a predetermined entry gate time to arrival in an air traffic control system.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description and are not intended as a definition of the limits of the invention.

FIG. 1 is a block diagram of one embodiment of the present invention;

FIG. 3 is a schematic diagram of some of the blocks shown in the diagram of FIG. 1;

FIG. 5 is a schematic diagram of still other blocks of the diagram shown in FIG. 1;

FIGS. 7 and 8 are schematic diagrams of still other of the blocks of the diagram shown in FIG. 1;

FIG. 9 is a diagrammatic view of a synchronizing and pulse source shown in FIG. 1;

FIG. 10 is a graph illustrating the pulse time relationships of the pulses generated by the source shown in FIG. 9;

FIG. 11 is a block diagram of a gating signal generator shown in FIG. 1;

FIG. 12 is a block diagram of a coincidence gate shown in FIG. 11;

FIG. 13 is a block diagram of a strobe identity display device shown in FIG. 1;

FIG. 14 is a partial isometric view of an electromechanical monitoring system of the present invention;

FIGS. 15 and 16 are broken isometric views of the structures shown in FIG. 14; and FIGS. 17 and 18 are broken isometric views of alternative marker means which may be employed with the embodiment of the invention shown in FIG. 14.

Figure 4:
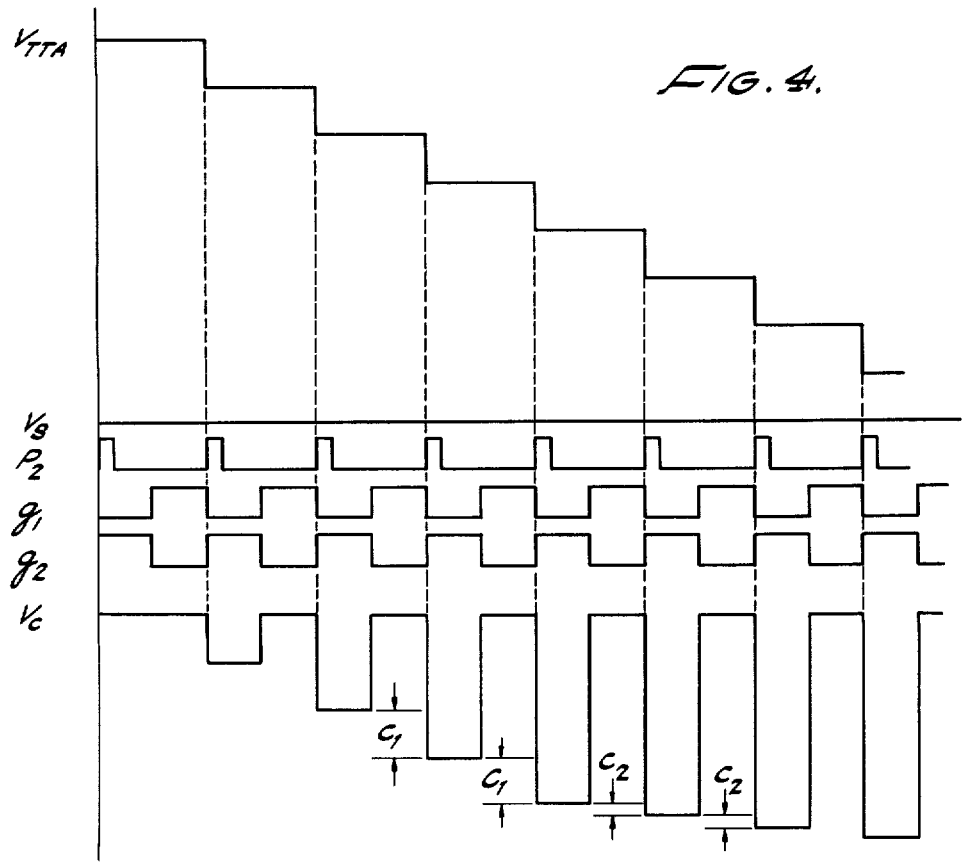
FIG. 4 is a graph of a group of waveforms characteristic of the operaiton of some of the circuitry shown in FIG. 3.

In the drawings in FIG. 1 a specific embodiment of the monitoring system of the invention is shown to be adapted to receive five signals from an air traffic control system. The signals are a time-to-arrival (TTA) sweep voltage, which may be a moving staircase voltage, a synchronizing pulse signal $P_2$ and a plurality of gating signals $I_G$, $O_G$, and $R_G$. In one specific embodiment of the invention all three gating signals are provided, viz. an identity gating signal, $I_G$, and occupied gating signal, $O_G$, and a reserved gating signal, $R_G$. The TTA sweep voltage, the synchronizing pulse $P_2$ and the identity, occupied and reserved gating signals are all synchronized. For example, the pulse $P_2$ is normally produced by a synchronizing and pulse source 100. The TTA sweep voltage is generated by a TTA sweep generator 200, the staircase steps of the TTA voltage being generated in response to the $P_2$ pulse. The gating signals are then generated by a gating signal generator 300 for particular steps of the TTA staircase sweep voltage.

The monitoring system of the invention is employed to produce a display of TTA schedules generated by an associated air traffic control system. Accordingly this display is made in conjunction with a cathode-ray tube 400 having a cathode 402, a beam intensity control electrode 404, a focusing electrode 406, a focusing coil 408, and a luminescent screen 410. The tube 400 is, in addition, provided with a horizontal deflection coil 412 and a vertical deflection coil 414, which are connected respectively to horizontal and vertical sweep amplifiers 416 and 418. A focusing adjustment circuit 420 is connected to both the focusing electrode 406 and the focusing coil 408. The focusing adjustment circuit may simply be a potentiometer having an adjustable or movable tap as will be explained subsequently. The cathode-ray tube beam intensity is controlled through signals applied both at the cathode 402 and at the beam intensity control electrode 404. The cathode 402 is supplied with control pulses through an inverter amplifier 422 and the beam intensity control electrode 404 is supplied with blanking pulses through an intensity control circuit 424. The inverter amplifier 422 may be conventional and the intensity control circuit 424 may also simply be a potentiometer having a movable tap.

The monitoring system of the invention shown in FIG. 1 is employed to produce a display on the luminescent screen 410 of the cathode-ray tube 400 first by producing two double frequency gating signals $g_1$, $g_2$ by a gate multivibrator 500, which is operated by a synchronizing pulse $P_2$. The gate multivibrator 500 may accordingly be a conventional delay or monostable multivibrator. The gate multivibrator 500 may produce the output gates $g_1$ and $g_2$ which appear at alternate times. Preferably the gates $g_1$ and $g_2$ are of equal width. The gate $g_1$ is impressed upon a TTA and strobe time sharing circuit 600 which is a switch means sampling circuit employed to alternately sample the TTA sweep voltage and a substantially constant strobe marker voltage adjustable by a rotatable disc 602, which may be mechanically connected to the movable tap of a potentiometer. A TTA register 604 is then mechanically connected to the disc 602 to indicate the time-to-arrival proportional to the horizontal position of a TTA strobe line which is generated by means which will be explained subsequently. For this reason the TTA register 604 may be simply a revolution counter-register.

The output voltage of the TTA and strobe time sharing circuit 600 is the horizontal sweep voltage for the horizontal sweep amplifier 416 of the cathode-ray tube 400. The horizontal sweep voltage is applied through a marker spacing control circuit 700 which preferably increases the horizontal TTA marker spacing for relatively small TTA schedules and reduces the spacing interval for relatively large TTA schedules. The widely spaced TTA markers may be equally spaced as may be the closely spaced markers. Both are, in fact, preferably equally spaced in order that the density of a group of aircraft may be more easily estimated and so that the time-to-arrival of an aircraft assigned to a particular schedule may be more easily calculated.

The vertical sweep circuit of the cathode-ray tube 400 includes a blanking multivibrator 800 which is responsive to both of the gates $g_1$ and $g_2$ and produces a recurrent output blanking pulse $b$ which is impressed upon the intensity control circuit 424 to blank the beam of the cathode-ray tube 400 during retrace of a sawtooth voltage which is generated by a vertical sweep generator 900. The sawtooth voltage is generated in response to the application of a pulse $p$ to vertical sweep generator 900 by the blanking multivibrator 800. The sawtooth voltage generated by the vertical sweep generator 900 is then applied directly to the vertical sweep amplifier 418 of the cathode-ray tube 400.

The beam of the cathode-ray tube 400 is gated on at appropriate intervals during the vertical sweep of the beam by the application of pulses to the cathode 402 of the tube 400. These gates are called display gates and are generated respectively by a strobe display gate generator 1000 and a plurality of schedule display gate generators 1100. A strobe time sharing gate generator 1200 and a schedule time sharing gate generator 1300 are then respectively employed to pass the display gates to the tube 400. To this end a strobe time sharing gate generated by the strobe time sharing gate generator 1200 is impressed upon a strobe gate combining circuit 1400, which is a circuit adapted to pass the strobe display gate $S_g$ generated by the strobe display gate generator 600 whenever a strobe time sharing gate is received. The strobe display gate $S_g$ is then impressed upon a video mixer 1500.

A plurality of schedule display gates for example, which may be indicated as $I_g$, $O_g$, $R_g$ and $B_g$ are also impressed on the video mixer 1500 when they are passed by a plurality of corresponding schedule gate combining circuits 1600, which are employed to pass the schedule display gates generated by the schedule display gate generator 1100. At least one of the schedule display gates, however, is still not passed by a corresponding schedule gate combining circuit 1200 except when a corresponding gating signal is received from the gating signal generator 300. In addition, the corresponding schedule display gate is not passed unless a schedule time sharing gate is received by the corresponding schedule gate combining circuit 1600 at the same time the gating signal is received. According to a specific embodiment of the invention, however, one schedule display gate, hereafter known as the baseline display gate or the $B_g$ display gate, is passed only by the schedule time sharing gate impressed upon a corresponding baseline gate combining circuit 1120–B.

All of the gates $I_g$, $O_g$, $R_g$ and $B_g$ are then impressed upon the tube 400 together but on a time shared basis with the strobe gate $S_g$. The gates are impressed upon the tube 400 through the video mixer 1500, which passes all of these gates to the cathode 402 of the tube 400 through the inverter amplifier 422.

Figure 2:
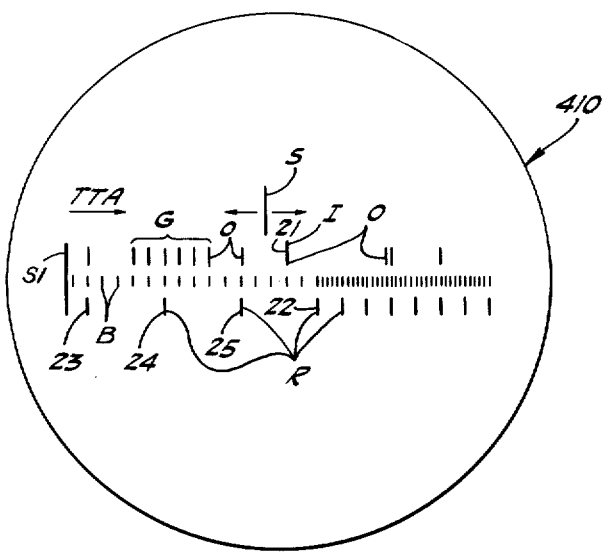
FIG. 2 is an enlarged view of a cathode-ray tube display which may be produced by the monitoring system of FIG. 1.

The function of the combination of the sweep voltages and the display gates applied to the cathode-ray tube 400 may be better understood when considered in connection with the enlarged view of the luminescent screen 410 of the cathode-ray tube 400 shown in FIG. 2. The present invention may be employed to produce a display such as the display shown on the face of the screen 410 in FIG. 2. The topmost vertical line shown in the display of FIG. 2 is called the strobe line and is indicated by S. A strobe line $S_1$ is also indicated at the left side of the luminescent screen 410 and may be produced by a novel switching arrangement which will be explained subsequently. Accordingly, if the strobe line $S_1$ is used, the strobe line S will not appear. The strobe line $S_1$ may be employed as marker means marking zero time to arrival as shown or at some other time-to-arrival position. Time to arrival thus increases toward the right from the strobe line $S_1$ and all marks to the right of the strobe line $S_1$ are finite times to arrival larger than zero.

Alternatively, the luminescent screen 410 may be provided with other marker means including an etched groove positioned at the strobe line $S_1$ or at some other position, whereby time to arrival may always be known with respect to the horizontal positions of the other marker lines shown on the screen 410. Another alternative may be practiced by painting a line on the luminescent screen 410.

A plurality of occupied gate markers O are shown below the strobe line S and are employed to indicate that an aircraft is assigned to that particular schedule maintained by the associated air traffic control system.

It is to be noted that one of the occupied gate markers 21 appears to be longer than the other occupied gate markers. It is not necessarily true that an occupied display gate generator is employed to produce a variable gate. In fact, according to a specific embodiment of the invention a gate is generated immediately subsequent to the occupied display gate called an identity display gate. Accordingly, the upper portion of the line 21 may be called an identity gate marker which is employed to designate a particular and identified aircraft occupying the schedule indicated at the time-to-arrival position of the line 21.

A plurality of baseline gate markers indicated at B are employed to indicate the time to arrival of each schedule maintained by the associated air traffic control system. It is not necessary to the invention that all the baseline gate markers be displayed, however, this type of display is preferable and is helpful in permitting an operator to approximate the density and the arrival period of a relatively dense group of aircraft.

A plurality of reserved gate markers R are shown disposed below the base line gate markers B. These gate markers, if noticed carefully, appear at every fifth baseline gate marker. The periodicity of the reserved gate markers R is not particularly significant except for the fact that the associated air traffic control system will normally regularly reserve a certain number of schedules for wave-off and priority aircraft. These reserved gate markers then indicate which schedules have actually been reserved by the control system.

The utility of the display of FIG. 2 and of using specific ones or combination of markers shown in FIG. 2 may be better illustrated in relation to specific monitoring problems of an air traffic control system as heretofore explained. For example, when a problem arises which makes a landing station unable to receive aircraft at a rather rapid rate over an extended length of time, the density of aircraft and the extent of the arrival time of a group such as, for example, a group indicated at G in FIG. 2, the occupied gate markers O may be used in conjunction with a stationary marker means positioned at $S_1$ or at some other known time-to-arrival position to estimate both the extent of the arrival period of all the aircraft of the group and the time to arrival of the first aircraft. As stated previously the marker means may be in fact the strobe line $S_1$ or an etched groove or painted line on the luminescent screen 410.

The proximity of the occupied gate markers indicate the density of traffic and the distance between the first and last occupied gate markers of the group G will be proportional to the arrival period of the whole group. Alternatively, the movable strobe line S may be employed and positioned near any one or preferably the first and last of the occupied gate markers O contained in the group G. The TTA register 604 shown in FIG. 1 may be read for each of these strobe positions. The arrival time of the whole group G may then obviously be calculated by subtracting the time to arrival of the first occupied gate marker from the time to arrival of the last occupied gate marker. The use of the strobe gate marker S with the occupied gate markers O thus provide the exact information needed, viz. the density of the group G and the arrival time of the group G.

Alternatively the baseline gate markers B may be employed with the occupied gate markers O to approximate both the density of the group G and the arrival of the group G. The difference in time to arrival between baseline gate marks may be, for example, thirty seconds. There are six aircraft assigned to each schedule within the group G so that the arrival period of the whole group G may be calculated as thirty seconds times six or 180 seconds. Because an aircraft is assigned to each of the adjacent schedules in the group G the aircraft density for the group is a maximum. The arrival time of the first aircraft can easily be obtained by counting the number of baseline marks to the left of the first occupied gate mark, viz. 4. It is seen that the first baseline gate marker is not exactly at zero time to arrival and therefore may be estimated to be fifteen seconds from the zero time-to-arrival according to the relative spacing of the first baseline gate marker and the strobe line $S_1$ and the relative spacing of adjacent baseline gate markers. The time to arrival of the first occupied gate marker O is then $4 \times 30 + 15 = 135$ seconds.

As stated previously, it may be desirable to determine the time to arrival of an identified aircraft, and in particular, an identified priority aircraft which may be damaged, low on fuel or which may be bearing an injured pilot. In such a case it may be desirable to communicate with and provide information to the aircraft landing station or the aircraft pilot. This information is, of course, the time to arrival of the aircraft. Accordingly, an identity gate marker I may be employed with the strobe gate marker S and the occupied gate markers O and specifically the marker I indicated at line 21 in FIG. 2. The extension of the occupied gate marker O at line 21 provided by the identity gate marker I then distinguishes the occupied gate marker O at line 21 from the rest of the occupied gate markers O. The strobe line S may then be moved in line with the line 21 and the TTA register 604 associated with the strobe gate marker aligning means may be read to determine the exact time to arrival of the aircraft assigned to that schedule.

Alternatively, the baseline gate markers B may be employed with the occupied gate markers O and the identity gate marker I to estimate the time to arrival of an identified aircraft. Specifically the number of baseline gate markers to the left of the identity gate marker I may be counted and multiplied by the time to arrival spacing interval between adjacent baseline gate markers to determine the approximate time to arrival of the identified aircraft. Specifically in the case shown in FIG. 2, there are fourteen baseline gate markers shown to the left of the line 21. As stated previously, the first baseline gate marker is spaced from zero time to arrival a distance approximately equal to half the spacing interval between adjacent baseline gate markers. Accordingly, the approximate time to arrival of the identified aircraft is $4 \times 30 + 15 = 135$ seconds based on a 30 second baseline gate marker spacing interval.

Some problems in the procedures of handling priority and wave-off aircraft may be solved by using the occupied gate markers O with the baseline gate markers B and the reserved gate markers R. Specifically, it may be desirable to find the first unoccupied reserved schedule. This may be done by comparing the reserved gate markers to the occupied gate markers. For example, in FIG. 2 the schedule of the line 22 of the reserved gate markers R is the first unoccupied schedule. As stated previously, it may be desirable to find the time to arrival of this schedule in order that it may be communicated to a priority or wave-off aircraft. This time to arrival may be approximated by again counting the number of baseline gate marks to zero time to arrival. In the instant case it is approximately 16.5. Thus, the time to arrival of an aircraft assigned to the schedule indicated at the line 22 will be $16.5 \times 30 = 495$ seconds. It is to be noted the reserve schedules 23, 24 and 25 are all occupied and thus wave-off and priority aircraft will not be assigned to these reserve schedules unless special provision is made in the associated air traffic control system for evicting aircraft classified as second or low priority aircraft for aircraft classified as first priority or special priority aircraft.

It is seen that with the use of the strobe line S, the reserve gate markers R, and the occupied gate markers O, the first unoccupied reserved schedule R indicated at the line 22 may be found on the screen 410 and the exact time-to-arrival of this schedule exactly determined by moving the strobe line S in line with the line 22. In accordance with this method, the TTA register 604 shown in FIG. 1 is read as before. It is seen, however, that if the relative position of the occupied and reserved gate markers are as shown in FIG. 2, then the baseline gate markers may be usefully employed with all three of the occupied, reserved and strobe gate markers to determine the exact time-to-arrival of the schedule at the line 22. In such a case the baseline gate marker may be employed as an extension of the reserved gate markers and the strobe gate marker S may be more easily aligned with the reserved gate marker at the line 22.

According to another feature of the invention, the identity of an aircraft having an assigned time to arrival proportional to the position of the strobe line S may be displayed as a binary number in a row of lights. This is indicated in FIG. 1 by a strobe identity display device 1700 which derives input signals from TTA sweep generator 200, TTA and strobe time sharing circuit 600, synchronizing and pulse source 100, and gating signal generator 300. The exact function of the strobe identity display device 1700 will be subsequently explained in greater detail.

As shown in FIG. 3, a negative TTA voltage is impressed upon that TTA and stroke time sharing circuit 600, and $P_2$ is simultaneously impressed upon the gate multivibrator 500. The gate multivibrator 500 is a simple monostable multivibrator for producing positive and negative output gates $g_1$ and $g_2$, $g_1$ being impressed on the TTA and strobe time sharing circuit 600. The gate multivibrator 500 has a time constant appropriate to remain in the low state for approximately half of the time step interval of the staircase TTA voltage. The TTA and strobe time sharing circuit 600 comprises: a voltage divider 610 to establish an appropriate output TTA staircase voltage through a sampling circuit 620 which is employed to alternately sample the TTA voltage and a substantially constant strobe voltage divided by a strobe voltage divider circuit 630. The negative going gate $g_1$ operates the sampling circuit 620 to cause a combined voltage $V_c$ to appear at the output of the TTA and stroke time sharing circuit 600. The gate $g_1$ thus causes a relay 621 within the sampling circuit 620 to be energized and thus to sample the TTA voltage appearing at the output of the voltage divider 610. The strobe voltage divider 630 is adjusted by the disc 602 which is mechanically connected to a potentiometer 631 and to the TTA register 604 which is adapted to display a number proportional to the time to arrival of an aircraft having a TTA voltage equal to the voltage supplied to a switch 632 connected to a tap 633 on the potentiometer 631. The switch 632 is connected from the potentiometer 631 to the sampling circuit 620 but is arranged to ground the output of the stroke voltage divider 630 when desired. The function of this switch 632 will be explained and more clearly understood in relation to the strobe display gate generator 1000. The combined voltage $V_c$ impressed upon marker spacing control circuit 700 is then reduced in relative amplitude when the negative TTA input voltage reaches a predetermined level. This is provided by a spacing circuit 710 which employs a bias diode 711 that serially connects a resistor 712 with a resistor 713 when the negative going TTA staircase voltage reaches a predetermined level. Thus, when the didoe 711 is no longer biased negatively, the TTA step levels are reduced in proportion to the ratio of the resistance of resistor 712 to the sum of the resistances of the resistors 712 and 713 in the well known manner. The combined voltage $V_c$ is impressed upon the spacing circuit 710 through a conventional cathode follower 720. Another cathode follower 730 is then connected to the output side of the spacing circuit 710 to the horizontal sweep amplifier 416 which is also of a conventional type.

The gate multivibrator 500 produces the positive going gate $g_2$ with the negative going gate $g_1$, both of which are impressed upon the blanking multivibrator 800. The blanking multivibrator 800 includes: an input pulse generator 810 which is employed to produce an output pulse when the gate multivibrator 500 changes state. The output of the pulse generator 810 is then impressed upon a monostable multivibrator 820 which provides an output pulse to drive the vertical sweep generator 900 shown in FIG. 5. The output of the pulse generator 810 is also impressed upon the intensity control circuit 424 which comprises simply a resistive network. The output of the intensity control circuit 424 is then applied to the current control electrode 404 of the cathode ray tube 400.

The relative time positions of input and output signals shown in FIG. 3 are illustrated in FIG. 4 where $V_{-TTA}$, a negative going TTA sweep voltage, is shown directly above a constant strobe voltage $V_s$. The correspondence in time of the synchronizing pulse $P_2$ is then shown below the strobe voltage $V_s$ with dotted lines 36 illustrating the described correspondence. The negative and positive going gates $g_1$ and $g_2$ are then shown respectively below the $P_2$ pulses and the combined samples of the strobe and TTA voltages $V_s$ and $V_{-TTA}$ is then indicated by $V_c$. It is to be noted that the differences in levels of the sampled TTA voltage changes from $C_1$ to $C_2$ where the bias on the diode 711 is reached in the marker spacing control circuit 700.

As shown in FIG. 5 the output of the horizontal sweep amplifier 416 is impressed upon horizontal deflection coil 412 and the blanking pulse $b$ from the intensity control circuit 424 is impressed upon the control grid 404 of the cathode ray tube 400. The negative and positive going gates $g_1$ and $g_2$ are then impressed respectively upon the strobe time sharing gate generator 1200 and the schedule time sharing gate generator 1300 which produce alternate time sharing gates of approximately equal time width. The negative pulse $p$ from the blanking multivibrator 800 is also impressed upon the vertical sweep generator 900 which is of the conventional type. The vertical sweep generator 900 generates a sawtooth voltage which is impressed upon the vertical sweep amplifier 418 and the display gate generators 1000 and 1100 shown in FIG. 7. The vertical sweep amplifier 418, connected to the vertical deflection coil 414, as the horizontal sweep amplifier 416, is also of the conventional type.

The strobe and schedule display gates from gate combining circuits 1400 and 1600 are simultaneously impressed upon the video mixer 1500 which is employed through the inverter amplifier 422 to gate the beam of the cathode-ray tube 400 on at appropriate times. The video mixer 1500 comprises: a plurality of parallel connected cathode followers 1510 and the inverter amplifier comprises an input amplifier 422–A, a cathode follower 422–C and a diode clamp 422–D which is employed to prevent the cathode 402 of the cathode-ray tube 400 from being driven above ground.

Figure 6:
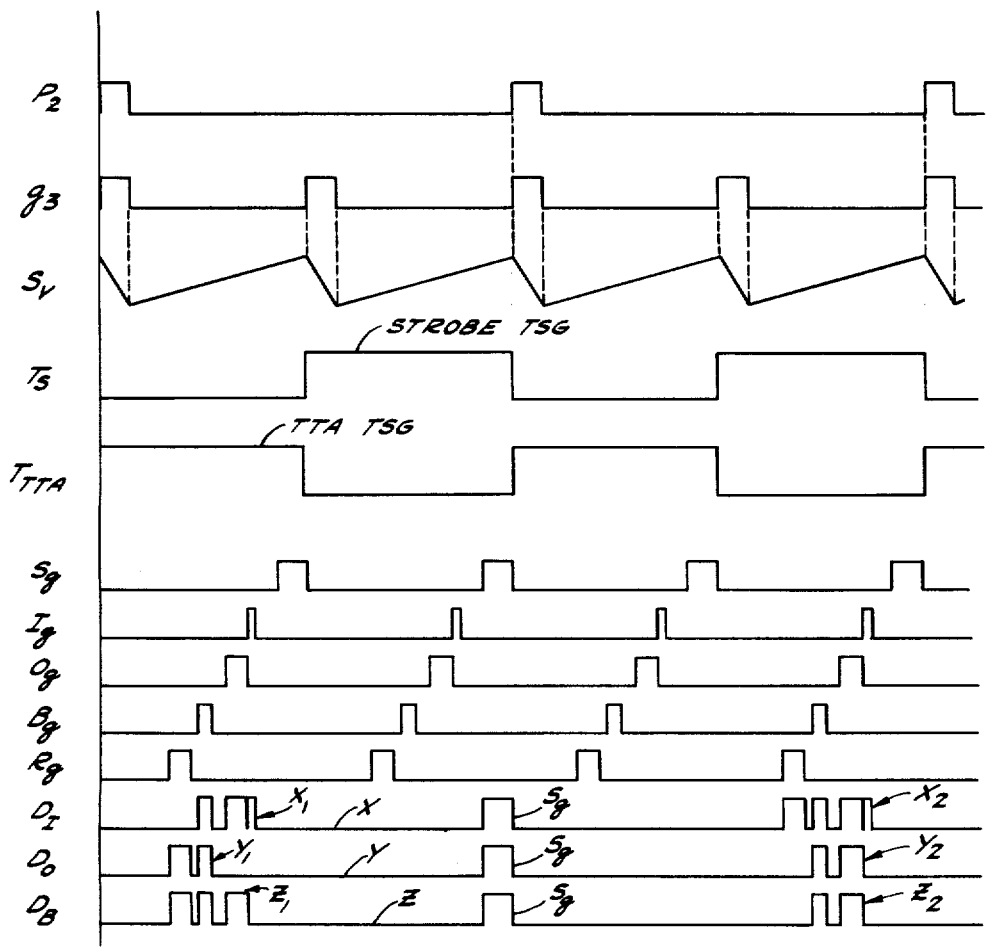
FIG. 6 is a graph of still other waveforms characteristic of the operation of the monitoring system of FIG. 1.

The synchronizing pulse $P_2$ is shown in FIG. 6 on an expanded time base below the sawtooth driving pulse $p$, the positive pulse which is impressed upon the vertical sweep generator 900 by blanking multivibrator 800. A sawtooth waveform $S_v$ produced by the vertical sweep generator 900 is shown below the pulses $p$ with its time correspondence therewith.

Figure 7:
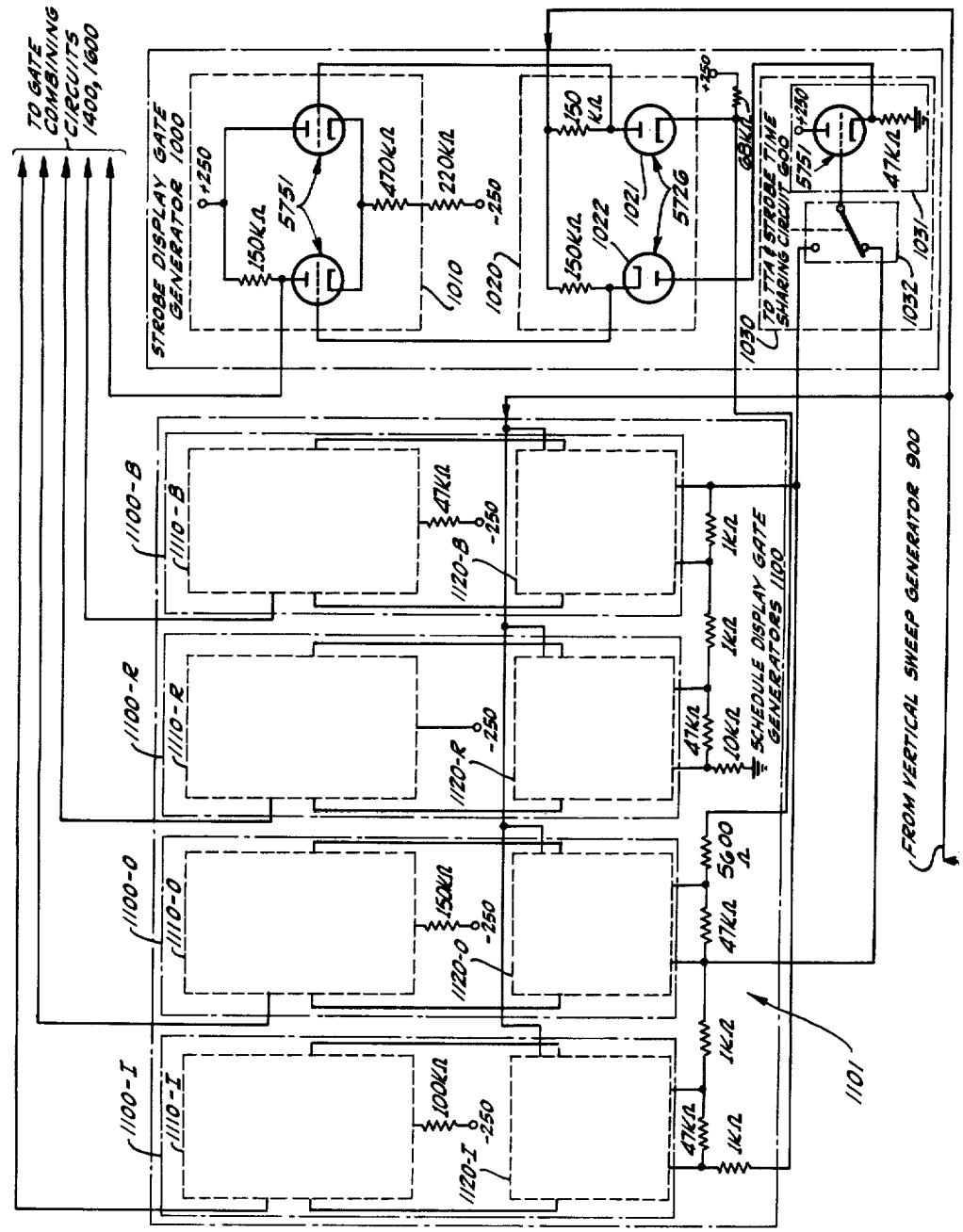

As stated previously the sawtooth waveform $S_v$ is impressed upon the display gate generators 1000 and 1100 as illustrated in FIG. 7 which produce display gates that are impressed upon the gate combining circuits 1400 and 1600 shown in FIG. 8. The strobe display gate generator 1000 is provided with a differential amplifier 1010 and a comparison circuit 1020 which is employed to drive the differential amplifier 1010 to produce an output pulse of any selected time width. The comparison circuit 1020 comprises two diodes 1021 and 1022 which are poled in opposite directions to cause the differential amplifier 1010 to be unbalanced except for a time during which the sawtooth voltage impressed thereupon is larger than the voltage appearing at the cathode of the diode 1021 but smaller than the voltage appearing at the plate of the diode 1022. The difference in potential of the cathode of the diode 1021 and the plate of the diode 1022 is then therefore determinative of the pulse width produced by the differential amplifier 1010.

A switching device 1030 is incorporated in the strobe display gate generator 1000 to alter the plate voltage of the diode 1022 in the comparison circuit 1020. The switching circuit 1030 includes the cathode follower 1031 and a switch 1032 which is mechanically connected to the switch 632 of the TTA and strobe time sharing circuit 600. The cathode follower 1031 is employed to change the voltage on the plate of the diode 1022 without disrupting the balance of a voltage divider circuit 1101 which is employed to regulate the difference voltages impressed upon the strobe gate comparison circuit 1020 and the plurality of schedule gate comparison circuits 1120–I, 1120–O, 1120–R and 1120–B, respectively corresponding to the identity, occupied, reserved and baseline display gate generators 1100–I, 1100–R, 1100–O, 1100–B. By moving the switch 1032 from the position shown, the length of the strobe line S as shown in FIG. 2 may be increased to that indicated at $S_1$ as shown in FIG. 2, and the strobe line positioned at zero time to arrival by the simultaneous operation of the switch 632 in the TTA and strobe time sharing circuit 600.

The comparison circuits 1120 of the schedule display gate generators 1100 may be identical with the strobe gate comparison circuit 1020 and the schedule display gate generators 1100 may be provided with four corresponding differential amplifiers 1110–I, 1110–O, 1110–R, 1110–B, which may be identical to the strobe gate differential amplifier 1010. The time correspondence of the display gates generated by the display gate generators 1000 and 1100 is shown in FIG. 6 where the strobe gates $S_g$ are shown above the schedule display gates $I_g$, $O_g$, $B_g$, and $R_g$. Time sharing gates $T_s$ and $T_{TTA}$ generated by the time sharing gate generators 1200 and 1300 are then shown below the reserved gates $R_g$.

All of the combinations of the display gates are shown as signals represented by lines X, Y and Z below the schedule time sharing gates $T_s$ and $T_{TTA}$.

A grouping of pulses $X_1$ shows a baseline, occupied, and identity gate together. It is to be noted that the strobe gates $S_g$ appear alternately with the schedule display gate groups. This is true because the time sharing gates $T_s$ and $T_{TTA}$ are on and off alternately on a time shared basis. Certain grouping of pulses $X_2$ shows a reserved, baseline, occupied and identity gate together. Grouping of pulses at the Y signal level indicated by a $Y_1$ indicates the existence of only reserved and baseline gate. Another grouping $Y_2$ indicates the existence of a baseline and occupied gate as do a second grouping $Z_2$ positioned directly below.

First grouping $Z_1$ on the Z signal level indicates the existence of reserved, baseline and occupied gates. It is to be noted that the baseline gate appears in all of the groupings although it is not absolutely necessary to employ a baseline gate as marker means.

The combining circuits 1400 and 1600 employed to aid in producing the gate groupings X, Y and Z are shown in FIG. 8 where the strobe, identity, occupied, reserved, and baseline gate combining circuits 1400, 1600–I, 1600–O, 1600–R, 1600–B are shown as simple resistive networks to produce output pulses which are impressed upon the video mixer 1500 at the appropriate coincidence of different gates and gating signals. The display gates from the display gate generators 1000 and 1100 are shown being impressed upon the appropriate gate combining circuits 1400 and 1600 as they arrive from the display gate generators 1000 and 1100. The schedule display gates are gated out at an appropriate $T_{TTA}$ time sharing gate interval and alternately the strobe display gate is gated out at a corresponding and alternate strobe time sharing gate. The baseline gate is always gated out and therefore has no corresponding gating signal as do the identity, occupied and reserved gate combining circuits, 1600–I, 1600–O, and 1600–R. As stated previously, the display gates impressed upon the video mixer 1500 in FIG. 5 are employed to gate the beam of the cathode-ray tube 400 on through the inverter amplifier 422. Identity, occupied and reserved gates are accordingly never displayed unless an appropriate gating signal $I_G$, $O_G$ or $R_G$ is impressed upon the appropriate schedule gate combining circuit 1600. Of course, no gating signal is impressed upon the strobe gate combining circuit 1400. The strobe gate $S_g$ is therefore always impressed alternately on the video mixer 1500 with the schedule display gates passed by the schedule gate combining circuits 1600.

The synchronizing and pulse source 100 is shown in FIG. 9 including a magnetic tape 101 which is employed to store identity and error control signals for subsequent transmittal to an aircraft in the air traffic control system associated with the monitoring system of the invention. A drum type of record may obviously be substituted for the tape 101. The reading of aircraft identities also initiates further error signal computation. Speed command signals $C_s$ are stored at an F position on the tape 101; altitude command signals $C_z$ are stored at a position E on the tape 101; and lateral control command signal $C_0$ are stored at a position D on the tape 101. A binary coded identity of an aircraft is stored at a position B on the tape 101 and a switch code is stored at a position A on the tape 101. The binary code of the identity of an aircraft is indicated by ID and the switch code is indicated by SW. Information is read by conventional reproducing heads from the tape 101 at a point 102 therealong. Normally information is recorded at a point 103 on the tape 101 and information is recorded in an advance position at a point 104 on the tape 101 where reassignment of aircraft to advance schedules is desired, e.g. where all aircraft are required to hold by circling at a constant altitude and range because the landing system associated with the air traffic control system is incapable of receiving aircraft.

The tape 101 is driven by a 32-tooth capstan drive 105, the teeth of which engage holes 106 in the tape 101. In a representative example in the capstan 105 is driven by a synchronous motor 118 having a shaft 113 operating at 1800 r.p.m. through a worm gear reducer 107 and a spur gear reducer 108. The worm gear reducer may be at a ratio of 12:1 and the spur gear may be at a ratio 1:2.25. The net reduction from the 1800 r.p.m. shaft of the synchronous motor 118 is then 16:3. Six sprocket holes 106 are provided in a section 109 of the tape 101 wherein the command signals, identity and switch code of one aircraft are recorded. In accordance with the driving mechanism one section 109 of the tape 101 passes the read point 102 in 33⅓ milliseconds. The length of the tape between the read point 102 and the normal record point 103 is immaterial although in a representative case two tape sections such as sections 109 are provided between these points. The length of the tape around the capstan from the normal record point 103 to the read point 102 is then 594 sprocket holes. Thus as the command signals identity and switch code of one aircraft is being read those of another are being recorded.

The command signals for each aircraft are generated every 3⅓ seconds. Timing pulses $P_1$, $P_m$, $P_2$, $P_3$, and $P_4$, synchronizing associated system components with the speed of the tape 101 during each 33⅓ millisecond data interval represented by sections 109 are provided by five magnetic pickup heads 110 energized by ferrous slug 111 in a phenolic wheel 112 on the 1800 r.p.m. shaft 113 of the synchronous motor 106. A sixth magnetic pickup head 114 is energized by ten additional ferrous slugs 115 on the same phenolic wheel 112. The magnetic pickup head 114 thus generates a group of ten consecutive pulses in an interval between pulses $P_1$ and $P_2$. These pulses are employed in what is known as the internal shift period of the system. The internal shift period is characterized by the fact that identity and switch codes are read from the tape 101 and different identities and switch codes recorded thereon. All the timing pulses are then applied to five blocking oscillators 116 except the pulse $P_4$ which is amplified elsewhere in the system.

Recording digital data on the tape 101 consists of saturating D.C. current in the record heads representing one in digital code being recorded in zero current representing "zero." Thus the magnetic tape 101 is left in a saturated state established by the D.C. erase for the binary "zero" representation and is saturated with the opposite polarity for the binary "one" representation.

Analogue data is recorded as a single "one" pulse whose width is proportional to the amplitude of the control pulse signal which it represents. In a representative example an analogue pulse width equal to 3.3 milliseconds may be assumed to be a zero command signal whereas a pulse whose width is less than 3.3 milliseconds may be considered a negative command signal and a pulse whose width is larger than 3.3 milliseconds may be considered a positive command signal.

The various timing pulses and their relative time positions in a 33⅓ millisecond data interval are shown in FIG. 10. The pulse $P_1$ initiates the shift period represented as approximately 9 milliseconds by the pulses $P_s$. A shift marker pulse $P_m$ appears between the 4th and 5th shift pulses $P_s$ to be utilized throughout this system. The pulse $P_2$ initiates a computation period and ends a shift period of 9 milliseconds. $P_3$ ends the computation period, viz. the computation of command or atitude error control signals. $P_4$ resets an output analog-to-digital converter which is employed with the air traffic control system. The time between the pulses $P_1$ and $P_3$ is indicated as 29 milliseconds; and the time between pulses $P_1$ and $P_4$ is indicated at 31 milliseconds.

The gating signal generator 300 as shown in FIG. 11 comprises an identity read amplifier 310, a current identity shift register 320, an identity selector plug 330, and a coincidence gate 340. The synchronizing and pulse source 100 is also shown in block diagram form in FIG. 11 which supplies shift pulses $P_s$ to the current identity shift register 320 and synchronizing pulses $P_2$ to a reservation counter 350 and to the TTA sweep generator 200, not shown in FIG. 11. Current identity is read by the read heads on the tape 101 and is amplified by the identity read amplifier 310 and shifted into the current identity shift register 320 by pulses $P_s$. The current identity is represented by ten binary bits in the current identity shift register 320, this identity being $I_c$. The complement of the binary number in the current identity shift register 320 is represented by $I_c'$. The occupied gating signal $O_G$ is provided by a flag bit in the current identity shift register 320 which is included in all aircraft identities to indicate that an aircraft has been assigned to a particualr schedule the data interval of which is being read. The flag bit serves to eliminate unnecessary gating and circuit complications. The remaining nine binary bits in the current identity shift register 320 are not needed to record the identity of only 100 aircraft, however, the shift register 320 is provided with ten bits to show that this number is arbitrary and may be changed to fit any air traffic control system.

The binary identity $I_c$ and $I_c'$ in the current identity shift register 320 is compared with a selected identity $I_s$, $I_s'$ in a coincidence gate 340. The selected identity $I_s$ is provided by the prewired identity selector plug 330 that impresses different potentials on 19 wires representing the binary number of a chosen aircraft identity $I_s$ and its complement $I_s'$ with an extra flag bit to insure that an identity has actually been shifted into the current identity shift register 320 before an identity gate $I_G$ is produced by the coincidence gate 340. The flag bit from the current identity shift register 320 is also introduced into the coincidence gate 340 from the current identity shift register 320 in addition to the 18 bits representing the binary number of aircraft currently being registered and the complement of that binary number.

A reserved gate is produced in an appropriate data interval by the reservation counter 350 shown in FIG. 11 which counts a predetermined number of pulses $P_2$ and thereby regularly produces a reserve gate $R_G$ after for example five $P_2$ pulses have been counted as was used in the example of the schedule status display shown in FIG. 2.

The coincidence gate 340 is more clearly illustrated in FIG. 12 where the identity selector plug 330 is shown to have a binary identity at 331, the complement of which is shown at 332. The selector plug 330 is provided with a plurality of male pin connectors 333 some of which are connected to an end male pin 334 which is adapted to be received by a female pin connector 335 in a panelboard 336. The female connector 335 may be maintained at some fixed potential such as a positive potential as shown. The remainder of the male pins 333 not connected to the male pin 334 may be connected to ground or left floating as shown in FIG. 12. The pins connected to the end pin 334 are representative of the "1" state of a binary bit and those not connected to end pin 334 represent the "0" state of a bit.

Panelboard 336 is provided with a plurality of female pin connectors 337 to receive the pins 333, the female connector 337 being connected to a plurality of "and" gates 338 and 339. Gates 338 correspond to the identity $I_c$ and the chosen identity $I_s$. The "and" gates 339 correspond to the complement of $I_c$ or $I_c'$ and the complement of the chosen identity $I_s$ or $I_s'$. Nine "or" gates 360 are necessarily employed to produce an identity gating signal $I_G$ when either corresponding selected identity bits of $I_s$, $I_s'$ and $I_c$, $I_c'$ are the same. A ten place "and" gate 361 is then connected to the nine "or" gates 360. It is to be noted that an "and" gate 362 in the plurality of "and" gates 338 is not connected to an "or" gate. Accordingly this is the flag bit of the current identity of an aircraft and must always be "1." The identity selector plug 330 will always provide a connection between the end or positive pin 334 and a flag pin 363 so that if no identity is shifted into the register 320 that no identity gate $I_G$ will be generated by the end gate 361. The logic of the end gate 361 thus is:

$$I_G = (I_{sf} \times I_{cf})(I_{sn} \times I_{cn} + I'_{sn} \times I'_{cn}) \\ \times (I_{s(n-1)} \times I_{c(n-1)} + I'_{s(n-1)} \\ \times I'_{c(n-1)}) \ldots (I_{s1} \times I_{c1} + I'_{s1} \times I'_{c1})$$

where $I_{sf}$ is the flag bit of the identity selector plug 330,
$I_{cf}$ is the flag bit of the current identity shift register 320,
$I_{sn}$ is the $n$th bit in the identity selector plug 330,
$I_{cn}$ is the $n$th bit in the current identity shift register 320,
$I'_{sn}$ is the complement of $I_{sn}$, and
$I'_{cn}$ is the complement of $I_{cn}$.

Thus $I_{s(n-1)}$ is the $n-1$st bit of the identity selector plug 330 and the $I_{c(n-1)}$ is the $n-1$st bit of the current identity shift register 320, etc.

The strobe identity display device 1700 is shown in FIG. 13 which is employed to produce an identity indication by sensible means 1710. For example, the identity of aircraft occupying a schedule approximately in line with the strobe marker S as indicated in FIG. 2 may be displayed by a row of lights 1711. The identity of such an aircraft is shifted into a strobe identity shift register 1720 by shifting the current identity $I_c$ into the strobe identity shift register 1720 at an appropriate time. Accordingly shift pulses $P_s$ are gated into the strobe identity shift register 1720 by a logical circuit 1730 comprising an integrator 1731 which is employed to produce a pulse when the positive staircase TTA sweep voltage exceeds the strobe voltage $V_c$. An inverter amplifier 1732 is employed to invert this pulse to introduce it to an "and" gate 1733. The "and" gate 1733 is also connected from the output of a flip-flop 1734 indicated as $F_2$. The flip-flop 1734 is set to the binary "1" state by a TTA reset pulse generated every one hundred data intervals for a one hundred aircraft system. The flip-flop 1734 is reset to the binary "0" state by an "and" gate 1735 that operates on reception of both a $P_1$ pulse and the "1" or $F_1$ output of a flip-flop 1736 that operates an "and" gate 1737 to pass the shift pulses $P_s$. The flip-flop 1736 is set to the binary "1" state by the "and" gate 1733 and is reset to the binary "0" state by the synchronizing pulses $P_2$. The use of the TTA reset pulse to set the flip-flop 1734 therefore requires that one strobe identity will be shifted into the strobe identity shift register 1720 only once during the examination of all of the data intervals included in the associated air traffic control system. The integrator 1731 also ensures that the current identity $I_c$ will be shifted into the strobe identity shift register 1720 only when the TTA staircase voltage exceeds the strobe voltage; that is $V_{TTA} > V_c$.

The logic of the circuit 1730 is as follows:

Shift pulses $P_2$ to strobe identity
Shift register $1720 = (F_1)(P_s)$ where $F_1 = (V_{TTA} > V_c)(F_2)(P_3)$,
$F_1' = P_2$,
$F_2 = TTA$ reset, and
$F_2' = (P_1)(F_1)$ A mechanical display assembly 10A is shown in FIG. 14, which may be operated electro-mechanically in a manner analogous to the operation of the cathode-ray tube 400 shown in FIG. 1. The assembly 10A includes top and bottom guide members 14A and 12A, which are connected together by four transverse members 16A, two of which are disposed on opposite sides of a guided mounting plate 18A at one end of the assembly 10A and two of which are disposed at the opposite end of the assembly 10A.

The plate 18A is guided for axial motion within the members 12A and 14A and is moved at a constant rate by a driving mechanism 20A, which includes a synchronous motor 22A that is employed to drive a worm gear 24A by a worm 26A. The worm gear 24A is then connected through a gear box arrangement 28A which includes means for driving a threaded rod 30A so that the plate 18A may be moved within the stationary members 12A and 14A. The gear box 28A should accordingly be provided with a slip mechanism to cause the threaded rod 30A to shift back to the right instantaneously after the plate 18A is driven a predetermined distance to the left. Accordingly, the plate 18A is caused to positively engage the left end of the threaded rod 30A by a spring 32A.

The plate 18A is provided with a plurality of apertures 34A, 36A and 38A. The plate 18A is also provided with indicia 44A that represent baseline gate markers. A strip 46A is disposed about the top guide member 14A to indicate the time to arrival of a particular schedule. The strip 46A thus corresponds to the strobe gate marker of the cathode-ray tube type display. Accordingly, the strip 46A may be moved horizontally by a dial adjustment 48A which is mechanically connected thereto and also to a TTA register 50A similar to the TTA register 604 shown in FIG. 1.

The lower member 12A of the assembly 10A is provided with supports 52A as is gear box 28A, synchronous motor 22A and a bracket 54A which is employed to support the shaft of the worm 26A. The supports 52A are employed to illustrate the stationary character of the apparatus supported thereby.

It is easily seen that the assembly 10A shown in FIG. 14 is analogous to the display which may be produced with a cathode-ray tube. As previously explained the strip 46A represents a strobe line. The apertures 34A in plate 18A represent identity gate markers. The apertures 36A in plate 18A represent occupied gate markers. The apertures 38A in the plate 18A represent reserved gate markers and the indicia 44A on the plate 42A represent occupied gate markers which naturally remain stationary with respect to the plate 18A.

The assembly 10A is again shown in FIG. 15 with the movable plate 18A and the stationary members 14A and 12A. The plate 18A is also shown in FIG. 16 in a broken away section having an aperture 56A. The plate 18A is again shown in FIG. 17 with a rectangular marker bar 58A projecting through the aperture 56A. The marker bar 58A is a portion of the armature of the relay 60A having a winding 62A which is operated by relay control circuit 64A. The control circuit is in turn operated by a relay gate 66A that receives a time to arrival or TTA digital gating signal and an identity, occupied or reserved gating signal corresponding to the particular position of the aperture 56A. For example, if the aperture 56A is one of the apertures 34A shown in FIG. 14, then the corresponding gating signal will be the identity gating signal. The corresponding gating signal for the apertures 36A is obviously the occupied gating signal and the apertures 38A have corresponding reserved gating signals impressed upon their relay gates 66A.

In the operation of the apparatus shown in FIG. 17 the rectangular bar marker 58A may be projected through the aperture 56A when, for example, the aperture 56A represents an occupied gate aperture 36A. The marker bar by projecting through the aperture 56A may indicate that an aircraft has been assigned to a particular schedule having a time to arrival proportional to its horizontal position on the assembly 10A shown in FIG. 14. In order to understand the operation of a particular circuit such as that shown in FIG. 17, it is necessary to note the character of the staircase TTA reference signal and how it is generated. The TTA sweep generator 200 may be used directly with the assembly 10A to produce an indication of the particular schedule error control signals being computed by an associated air traffic control system. These error control signals are employed to direct an aircraft on an assigned schedule. Thus, when the relay gate 66A receives a pulse from the digital time reference generator corresponding to a particular TTA schedule, relay control circuit 64A will be actuated if a corresponding identity, occupied or reserved gating signal is also received by the relay gate 66A.

A time-to-arrival error control signal may only be computed in a representative system every 3⅓ seconds, therefore, means must be additionally provided to keep the relay winding 62A energized over a period of at least 3⅓ seconds. For this reason the relay control circuit 64A may be a time delay relay control for keeping the winding 62A energized for at least this 3⅓ second computation interval.

Marker means analogous to that shown in FIG. 17 might be the use of a lamp such as a lamp 68A shown in FIG. 18. The lamp is similarly positioned behind the aperture 56A of the plate 18A to indicate by illumination the condition of a particular time-to-arrival schedule, viz. identified, occupied or reserved. Accordingly, the lamp 68A has a lamp control circuit 70A and a lamp gate 72A, the lamp control circuit 70A providing a time delay as the relay control circuit 64A and the lamp gate 72A operating in the same manner as the relay gate 68A in response to the TTA digital gating signal and a corresponding identity, occupied or reserved gating signal.

It is thus obvious that with the use of the invention the density, extent and time to arrival of a relatively dense group of aircraft may be determined to inform a landing station that such traffic conditions exist. In accordance with this feature of the invention the strobe marker or any other marker means may be employed with the occupied gate markers and any other markers desired. For example, particular advantages may be derived from employing either the strobe gate marker or the baseline gate markers. The time to arrival of a particular aircraft may also be determined with the use of the gating signal generator which may be employed to produce the identity gating signals. This in combination with the strobe gate marker may be employed also with the TTA register 604 to determine the exact time to arrival of any identified aircraft. Likewise the baseline gate markers may be used for estimating the approximate time to arrival of an identified aircraft.

It is also obvious from the foregoing that a novel means are disclosed to produce an identity gating signal at a time to arrival calculated to sweep time corresponding to the identity of the selected aircraft. This is specifically provided with a combination of the prewired identity selector plug 330, the current identity shift register 320 and the coincidence gate 340. The device of the present invention also illustrates why monitoring reserve schedules by employing reserve gate markers, "wave-off" and priority re-scheduling may be more easily accomplished.

The invention contemplates the use of a double sawtooth voltage to generate strobe and scheduled display gates in addition to sweeping the beam of the cathode-ray tube 400 vertically over the luminescent screen 410. The invention also contemplates the use of strobe and display gate generators 1000 and 1100 to generate display gates of any selected width by the utilization of the special comparison circuits 1020 and 1120 with corresponding differential amplifiers 1010 and 1110.

The invention also provides means to display the identity of an aircraft having a time to arrival approximately equal to the time to arrival proportional to the strobe marker position on the cathode-ray tube 400.

From the foregoing, it will be appreciated that the device of the present invention is for use with an air traffic control system wherein a plurality of aircraft are directed through a landing system entry gate in a manner such that they are scheduled to arrive approximately at ideal times and at ideal time intervals apart $n_1 t$, $n_2 t$, $n_3 t$ . . ., respectively, each ahead of a succeeding aircraft, $n_1$, $n_2$, $n_3$ . . ., each being any positive integer and $t$ being a minimum time interval between aircraft arrivals. In this case, when the occupied gate markers O are provided on a scale employing either the strobe gate markers S or the baseline gate markers B, the density and extent of a group of aircraft coming in may be easily determined, the baseline gate markers B or the strobe gate markers S being generally referred to as "reference marker means" herein. It is to be noted that the reference marker means are displayed at predetermined positions directly proportional to a known ideal time to arrival of a schedule established by the associated air traffic control system. Means are also provided in accordance with the invention to display the occupied gate markers O, such means being described herein as "schedule display means" for producing a plurality of visible occupied gate markers in physical positions spaced distances apart from adjacent occupied gate markers directly proportional to $n_1$, $n_2$, $n_3$ . . . respectively. It is to be noted that the present invention is therefore distinguishable from conventional air traffic control system displays in that the existence of aircraft is conventionally indicated by cathode-ray tube light spots positioned according to aircraft range. According to the present invention such spots are located in positions spaced apart which are equal, or are equal to an integral number of a basic minimum displacement corresponding to a minimum time interval between scheduled aircraft arrivals. Hence, true future traffic density determination at any time is based on the ideal guidance of the aircraft, which, of course, will take place eventually, and not based upon the position of aircraft, which positions may, at the time viewed, be in error.

In the variable speed air traffic control system, with which the invention is to be employed, it is to be noted that at distant ranges, aircraft will appear to be considerable distances apart, but going at such speeds that they can easily land at certain minimum time intervals apart, which time intervals are far from being directly proportional to the distance intervals by which they may be separated as indicated in a conventional range (B-scan) or plan position indicator (PPI) display.

Although several specific embodiments of the invention have been illustrated and described in detail, it is to be expressly understood that the invention is not limited thereto. Various changes may be made in the design or arrangement of parts without departing from the spirit and scope of the invention as the same will now be understood by those skilled in the art.

What is claimed is:

1. In a display device for use with an air traffic control system wherein a plurality of aircraft are successively directed through a landing system entry gate on predetermined and assigned schedules, and wherein a reference signal proportional to selected times-to-arrival of aircraft approaching the entry gate is generated on a time share basis and synchronously with at least one gating signal representative of the status of a particular time-to-arrival schedule, the display device including a cathode-ray tube having a sweep generator, an arrangement for controlling the cathode-ray tube beam intensity, said arrangement comprising: means for generating a strobe display gate at a selected strobe display time during the operation of the cathode-ray tube sweep generator, means for generating a strobe time sharing gate during a strobe display portion of the period over which the reference signal is substantially constant, a strobe gate combining circuit responsive to said strobe time sharing gate for passing said strobe display gate, at least one schedule display gate generator for producing a schedule display gate at a selected schedule display time during the operation of the cathode-ray tube sweep generator different from said strobe display time, means for generating a schedule time sharing gate during a schedule display portion of the period over which the reference signal is substantially constant, said schedule display portion being mutually exclusive of said strobe display portion, and at least one schedule gate combining circuit responsive to said schedule time sharing gate and to the air traffic control system schedule status gating signal for passing said schedule display gate.

2. In a display device for use with an air traffic control system wherein a plurality of aircraft are successively directed through a landing system entry gate on predetermined and assigned schdeules, and wherein a staircase reference signal proportional to selected times to arrival of aircraft approaching the entry gate is generated on a time shared basis and synchronously with an occupied gating signal, an identity gating signal, and a reserved gating signal representative of the occupied, identified and reserved status of a particular time-to-arrival schedule, the display device including a cathode-ray tube having a sweep generator, an arrangement for controlling the cathode-ray tube beam intensity, said arrangement comprising: strobe marker means for generating a strobe display gate at a selected strobe display time during the operation of the cathode-ray tube sweep generator, means for generating a strobe time sharing gate during a strobe display portion of the period over which the reference signal is substantially constant, a strobe gate combining circuit responsive to said strobe time sharing gate for passing said strobe display gate, an occupied gate generator for producing an occupied display gate at a selected occupied display time during the operation of the cathode-ray tube sweep generator different from said strobe display time, means for generating a schedule time sharing gate during a schedule display portion of the period over which the reference signal is substantially constant, said schedule display portion being mutually exclusive of said strobe display portion, and an occupied gate combining circuit responsive to said schedule time sharing gate and to the air traffic control system occupied gating signal for passing said occupied display gate.

3. The invention as defined in claim 2, wherein an identity display gate generator is provided to produce an identity display gate at a selected identity display time during the operation of the cathode-ray tube sweep generator different from both of said strobe and occupied display times, and wherein an identity gate combining circuit responsive to said schedule time sharing gate generator and to the air traffic control system identity gating signal is provided for passing said identity display gate.

4. The invention as defined in claim 1, wherein a reserved display gate generator is provided to produce a reserved display gate at a selected reserved display time during the operation of the cathode-ray tube sweep generator different from both said strobe and occupied display times, and wherein a reserved gate combining circuit responsive to said schedule time sharing gate generator and to the air traffic control system reserved gating signal is provided for passing said reserved display gate.

5. The invention as defined in claim 4, wherein a baseline display gate generator is provided for producing a baseline display gate at a selected baseline display time during the operation of the cathode-ray tube sweep generator, and wherein a baseline gate combining circuit responsive to said schedule time sharing gate is providing for passing said baseline display gate.

6. In a display device for use with an air traffic control system wherein a plurality of aircraft are successively directed through a landing system entry gate on predetermined and assigned schedules, and wherein a staircase reference signal proportional to selected times to arrival of aircraft approaching the entry gate is generated on a time shared basis and synchronously with a baseline gating signal, an occupied gating signal, an identity gating signal, and a reserved gating signal, representative of the status of particular time-to-arrival schedules the display device including a cathode-ray tube having a luminescent screen and a sweep generator, an arrangement for controlling the cathode-ray tube intensity, said arrangement comprising: means for generating a schedule time sharing gate during a schedule display portion of the period over which one of the steps of the staircase reference signal remains at a constant level, a baseline gate generator for producing a baseline display gate at a selected baseline display time during the operation of the cathode-ray tube sweep generator, a baseline gate combining circuit responsive to said schedule time sharing gate and to the air traffic control system baseline gating signal for passing said baseline display gate, an occupied gate generator for producing an occupied display gate at a selected occupied display time during the operation of the cathode-ray tube sweep generator different from said baseline display time, and an occupied gate combining circuit responsive to said schedule time sharing gate and to the air traffic control system occupied gating signal for passing said occupied display gate.

7. The invention as defined in claim 6, wherein the following is additionally provided: a strobe display gate generator for producing a strobe display gate at a selected strobe display time during the operation of the cathode-ray tube sweep generator different from said baseline and occupied display times, means for generating a strobe time sharing gate during a strobe display portion of the period over which one of the steps of the staircase reference signal remains at a constant level, said strobe display portion being different from said occupied and baseline display portions, and a strobe gate comparison circuit responsive to said strobe time sharing gate for passing said strobe display gate.

8. The invention as defined in claim 7, wherein all of said display gate generators have a common bias supply, wherein the bias to said strobe display gate generator may be varied from an adjustable value to fixed value proportional to zero time to arrival, said strobe display gate generator being provided with a bias supply from a cathode follower circuit, and wherein a switch is connected to the input side of said cathode follower circuit to change the bias thereon and thereby to change the bias on said strobe display gate generator without affecting the bias supplies of either said baseline display gate generator or said occupied display gate generator.

9. The invention as defined in claim 6, wherein the following is additionally provided: an identity display gate generator for producing an identity display gate at a selected identity display time during the operation of the cathode-ray tube sweep generator different from said baseline and occupied display times, and identity gate comparison circuit responsive to said schedule time sharing gate and to the control system identity gating signal for passing said identity display gate.

10. The invention as defined in claim 6, wherein the following is additionally provided: a reserved display gate generator for producing a reserved display gate at a selected reserved display time during the operation of the cathode-ray tube sweep generator different from said baseline and occupied display times, and a reserved gate comparison circuit responsive to said schedule time sharing gate and to the control system reserved gating signal for passing said reserved display gate.

11. In a display device for use with an aircraft control system wherein a plurality of aircraft are directed through a landing system entry gate on predetermined and assigned schedules, and wherein a staircase reference signal proportional to selected times to arrival of aircraft approaching the entry gate is generated on a time shared basis and synchronously with a synchronizing pulse and a plurality of gating signals representative of the status of a particular time-to-arrival schedule, the display device including a cathode-ray tube having first and second sweep circuits, an arrangement for controlling the cathode-ray tube beam intensity, said arrangement comprising: means coupled to the first sweep circuit for sampling the staircase reference signal and the strobe signal once each time the amplitude of the staircase reference signal changes by one step, means for generating a sawtooth voltage each time the reference signal and the strobe signal is sampled, said sawtooth voltage being applied to the second sweep circuit, a strobe display gate generator responsive to said sawtooth voltages for generating a strobe display gate at a selected time during the generation of the sawtooth voltages, means responsive to the synchronizing signal for generating a strobe time sharing gate during a strobe display portion of the period over which the staircase reference signal is substantially constant, a strobe gate comparison circuit responsive to said strobe display gate for passing said strobe display gate, a plurality of schedule display gate generators for producing a plurality of display gates at selected and different schedule display times in response to said sawtooth voltage, said schedule display times being different from said strobe display times, means for generating a schedule time sharing gate during a schedule display portion of the period over which the reference signal remains at a substantially constant step level, said schedule display portion being different from said strobe display portion, and a plurality of schedule gate combining circuits corresponding to said schedule display gate generators responsive to said schedule time sharing gate for passing said schedule display gates respectively, at least one of said schedule gate combining circuits being adapted to pass its corresponding schedule display gate only in response to the simultaneous application of said schedule time sharing gate and the air traffic control system schedule status gating signal corresponding to the schedule display gate passed by said one schedule gate combining circuit.

12. The invention as defined in claim 11, wherein a gate multivibrator responsive to the synchronizing signal is employed to actuate said sampling means, and wherein a blanking multivibrator responsive to said gate multivibrator is employed to drive said sawtooth generator.

13. In a display device for use with an air traffic control system wherein a plurality of aircraft are directed through a landing system entry gate on predetermined and assigned schedules, and wherein a staircase reference signal proportional to selected times to arrival of aircraft approaching the entry gate is generated on a time shared basis and synchronously with a synchronizing pulse and a plurality of gating signals representative of the status of a particular time-to-arrival schedule, the display device including a cathode-ray tube having first and second sweep circuits, sawtooth sweep generator coupled to the second sweep circuit, an arrangement for controlling the cathode-ray tube beam intensity, said arrangement comprising: means coupled to the first sweep circuit for alternately sampling the staircase reference signal and the strobe signal, means for generating a strobe display gate at a selected strobe display time during the operation of the cathode-ray tube sweep generator, means for generating a strobe time sharing gate during a strobe display portion of the period over which the reference signal is substantially constant, a strobe gate combining circuit responsive to said strobe time sharing gate for passing said strobe display gate, at least one schedule display gate generator for producing a schedule display gate at a selected schedule display time during the operation of the cathode-ray tube sweep generator different from said strobe display time, means for generating a schedule time sharing gate during a schedule display portion of the period over which the reference signal is substantially constant, said schedule display portion being mutually exclusive of said strobe display portion, and at least one schedule gate combining circuit responsive to said schedule time sharing gate and to the air traffic control system schedule status gating signal for passing said schedule display gate.

14. In a display device for use with an air traffic control system wherein a plurality of aircraft are successively directed through a landing system entry gate on predetermined and assigned schedules, and wherein a staircase reference signal proportional to the selected times to arrival of aircraft approaching the entry gate is generated on a time shared basis and synchronously with a synchronizing signal, the display device including a cathode-ray tube having a sweep generator, a sweep circuit arrangement for controlling the cathode-ray tube beam position, said arrangement comprising: adjustable means for providing a substantially constant strobe signal for any selected adjustment, switch means coupled to the sweep circuit for alternately sampling the staircase reference signal and said strobe signal, a gate multivibrator responsive to the synchronizing signal for actuating said switch means, and means responsive to the adjustment of said adjustable strobe signal means for registering the time to arrival of one of the aircraft.

15. The invention as defined in claim 14, wherein a mark spacing control circuit is connected intermediate said switch means and the sweep circuit for proportionately reducing the output signal of said switch means when said switch means passes an output voltage representative of a relatively large time to arrival.

16. In a display device for use with an air traffic control system wherein a plurality of aircraft are directed through a landing system entry gate on predetermined and assigned schedules, and wherein a staircase reference signal proportional to selected times to arrival of aircraft approaching the entry gate is generated on a time shared basis and synchronously with a synchronizing pulse and a plurality of gating signals representative of the status of a particular time-to-arrival schedule, the display device including a cathode-ray tube having first and second sweep circuits, an arrangement for controlling the cathode-ray tube beam intensity, said arrangement comprising: means coupled to the first sweep circuit for sampling the staircase reference signal and the strobe signal once each time the amplitude of the staircase increases by one step, means for generating a sawtooth voltage each time the reference signal and the strobe signal is sampled, said sawtooth voltage being applied to the second sweep circuit, a strobe display gate generator responsive to said sawtooth voltages for generating a stobe display gate at a selected time during the generation of the sawtooth voltages, means responsive to the synchronizing signal for generating a strobe time sharing gate during a strobe display portion of the period over which the staircase reference signal is substantially constant, a strobe gate comparison circuit responsive to said strobe display gate, a plurality of schedule display gate generators for producing a plurality of schedule display gates at selected and different schedule display times in response to said sawtooth voltage, said schedule display times being mutually exclusive and different from said strobe display time, means for generating a schedule time sharing gate during a schedule display portion of the period over which the reference signal is substantially constant, said schedule display portion being different from said strobe display portion, and a plurality of schedule gate combining circuits, each of said schedule gate combining circuits being responsive to a corresponding schedule time sharing gate and to a corresponding control system gating signal for passing a corresponding schedule display gate.

17. The invention as defined in claim 16, wherein the following is additionally provided: a gate multivibrator responsive to the synchronizing signal for producing a double frequency gating signal to operate said sampling means, an intensity control circuit for blanking the beam of the cathode-ray tube during retrace, and a blanking multivibrator responsive to said gate multivibrator for driving both said intensity control circuit and said sawtooth voltage generating means.

18. The invention as defined in claim 11, wherein said sampling means includes adjustable means for providing a substantially constant strobe signal for any selected adjustment, switch means coupled to the sweep circuit for alternately sampling the staircase reference signal and said strobe signal, a gate multivibrator responsive to the synchronizing signal for actuating said switch means, and wherein means responsive to the adjustment of said adjustable strobe signal means are provided for indicating the time to arrival of one of the aircraft.

19. The invention as defined in claim 2, wherein the following are additionally provided: a strobe signal source for producing a strobe signal representative of the time-to-arrival position of a strobe marker on the cathode-ray tube, a current identity shift register for indicating the identity of an aircraft, the time to arrival of which is concurrently represented by the staircase reference signal, a strobe identity shift register, means for indicating the state of said strobe identity shift register, and means for shifting one identity in said current identity shift register into said strobe identity shift register when said staircase reference signal is approximately equal to said strobe signal.

20. In a display device for use with a variable speed air traffic control system wherein a plurality of aircraft are successively directed through a landing system entry gate in a manner such that they are ideally scheduled to arrive approximately at ideal times and at ideal time intervals $n_1 t, n_2 t, n_3 t \ldots$ each ahead of a succeeding aircraft $n_1, n_2, n_3 \ldots$ each being any positive integer, and $t$ being a minimum time interval between aircraft arrivals, the combination comprising: a synchronous time-to-arrival generator for producing a staircase output signal with each of the steps thereof being identical in amplitude and representing the ideal scheduled times to arrival at an entry gate of aircraft which may be, but are not necessarily, assigned to meet each respective and corresponding schedule, said time-to-arrival generator output signal having a staircase waveform to permit the guidance of each of a plurality of aircraft assigned to schedules on a time shared basis as a function of the magnitude of a corresponding step of said staircase signal during a corresponding error signal computation interval of time; storage means operable synchronously with said time-to-arrival generator to produce an output signal only during the particular ones of the steps of said staircase signal representing ideal scheduled times to arrival of aircraft actually under guidance and previously assigned to schedules; schedule display means for producing a plurality of occupied gate markers in physical positions spaced distances apart from adjacent occupied gate markers directly proportional to $n_1, n_2, n_3 \ldots$, respectively, representing the ideal times to arrival corresponding only to aircraft actually assigned to schedules; and means for providing a reference marker at a predetermined position directly proportional to a known ideal time to arrival of a schedule established by said air traffic control system.

21. In a display device for use with a variable speed air traffic control system wherein a plurality of aircraft are successively directed through a landing system entry gate in a manner such that they are ideally scheduled to arrive approximately at ideal times and at ideal time intervals $n_1t$, $n_2t$, $n_3t$ . . . each ahead of a succeeding aircraft, $n_1$, $n_2$, $n_3$ . . . each being any positive integer, and $t$ being a minimum time interval between ideally scheduled aircraft arrivals, the combination comprising: means for providing a reference marker at a predetermined position directly proportional to a known ideal time to arrival of a schedule established by said air traffic control system; schedule display means for producing a plurality of occupied gate markers in physical positions spaced distances apart from adjacent occupied gate markers directly proportional to $n_1$, $n_2$, $n_3$ . . ., respectively; and means to produce at least one identity gate marker in line with an adjacent occupied gate marker to distinguish a selected occupied gate marker from the remainder of the occupied gate markers displayed, said means to produce an identity gate marker including input means for producing an identity gating signal, said input means comprising an identity selector plug, means for maintaining selected ones of a first set of lead wires from said identity selector plug at different potentials corresponding to the identity of a selected aircraft, a current-identity shift register for maintaining selected ones of a selected set of lead wires at different potentials corresponding to the identity of a particular aircraft, the time of arrival of which is currently being indicated, and means for comparing the potentials of each set of said lead wires to produce an identity gating signal when the potentials on corresponding pairs of each of said sets are the same.

22. In a system for controlling a plurality of aircraft, a device for displaying the ideally scheduled time to arrival of each of said plurality of aircraft at a predetermined location, said device comprising: means for providing a reference marker at a predetermined position in a planar display directly proportional to a known ideal time to arrival of an aircraft; schedule display means actuable to produce a predetermined maximum number of equally spaced occupied gate markers equal to the capacity of said system moving in the same direction in synchronism with each other at the same rate independent of the instantaneous position and speed of said aircraft; flag means associated with said system to indicate whether or not an aircraft is under guidance thereby; and means responsive to the output of said flag means to actuate said schedule display means to produce only selected ones of said occupied gate markers corresponding to aircraft actually under guidance.

23. In a system for controlling a plurality of aircraft, a device for displaying the ideally scheduled time to arrival of each of said plurality of aircraft at a predetermined location, said device comprising: schedule display means actuable to produce a predetermined maximum number of equally spaced occupied gate markers equal to the capacity of said system moving in the same direction in synchronism with each other at the same rate independent of the instantaneous position and speed of said aircraft; flag means associated with said system to indicate whether or not an aircraft is under guidance thereby; means responsive to the output of said flag means to actuate said schedule display means to produce only selected ones of said occupied gate markers corresponding to aircraft actually under guidance; and visible reference marker means for producing a plurality of baseline gate markers in line with all of the occupied gate markers that said schedule display means is capable of producing.

24. In a system for controlling a plurality of aircraft, a device for displaying the ideally scheduled time to arrival of each of said plurality of aircraft at a predetermined location, said device comprising: visible reference marker means for producing a strobe gate marker at a selected position in a predetermined range on the luminescent screen of a cathode-ray tube; schedule display means actuable to produce on said cathode-ray tube a predetermined maximum number of equally spaced occupied gate markers equal to the capacity of said system moving in the same direction in synchronism with each other at the same rate independent of the instantaneous position and speed of said aircraft; flag means associated with said system to indicate whether or not an aircraft is under guidance thereby; and means responsive to the output of said flag means to actuate said schedule display means to produce only selected ones of said occupied gate markers corresponding to aircraft actually under guidance.

25. The invention as defined in claim 24, wherein the selected position of said strobe gate marker is proportional to a zero time to arrival.

26. In a system for controlling a plurality of aircraft, a device for displaying the ideally scheduled time to arrival of each of said plurality of aircraft at a predetermined location, said device comprising: means for providing a reference marker at a predetermined position in a planar display directly proportional to a known ideal time to arrival of an aircraft; schedule display means actuable to produce a predetermined maximum number of equally spaced occupied gate markers equal to the capacity of said system moving in the same direction in synchronism with each other at the same rate independent of the instantaneous position and speed of said aircraft; flag means associated with said system to indicate whether or not an aircraft is under guidance thereby; means responsive to the output of said flag means to actuate said schedule display means to produce only selected ones of said occupied gate markers corresponding to aircraft actually under guidance; and means to produce at least one identity gate marker in line with an adjacent occupied gate marker to distinguish a selected occupied gate marker from other occupied gate marks which are displayed therewith.

27. In a system for controlling a plurality of aircraft, a device for displaying the ideally scheduled time to arrival of each of said plurality of aircraft at a predetermined location, said device comprising: schedule display means actuable to produce a predetermined maximum number of equally spaced occupied gate markers equal to the capacity of said system moving in the same direction in synchronism with each other at the same rate independent of the instantaneous position and speed of said aircraft; flag means associated with said system to indicate whether or not an aircraft is under guidance thereby; means responsive to the output of said flag means to actuate said schedule display means to produce only selected ones of said occupied gate markers corresponding to aircraft actually under guidance; visible reference marker means for producing a plurality of baseline gate markers in line with all of the occupied gate markers that said schedule display means is capable of producing; and means to produce at least one reserved gate marker in line with a corresponding baseline gate marker to indicate its reserved status.

References Cited in the file of this patent

UNITED STATES PATENTS

| | | |
|---|---|---|
| Re. 23,643 | Deloraine et al. | Apr. 14, 1953 |
| 2,460,597 | Rodgers | Feb. 1, 1949 |
| 2,505,314 | Wallace et al. | Apr. 25, 1950 |
| 2,780,682 | Klein | Feb. 5, 1957 |
| 2,909,622 | Bell et al. | Oct. 20, 1959 |

UNITED STATES PATENT OFFICE

CERTIFICATE OF CORRECTION

Patent No. 3,111,643                                November 19, 1963

Alvin Guy Van Alstyne et al.

It is hereby certified that error appears in the above numbered patent requiring correction and that the said Letters Patent should read as corrected below.

Column 10, line 42, after "done" insert -- simply --; column 11, lines 15 and 43, for "stroke", each occurrence, read -- strobe --; same column 11, line 54, for "didoe" read -- diode --; column 21, lines 15 and 16, for "providing" read -- provided --; column 22, line 2, after "and", second occurrence, insert -- an --.

Signed and sealed this 11th day of August 1964.

(SEAL)
Attest:

ERNEST W. SWIDER                                EDWARD J. BRENNER
Attesting Officer                                    Commissioner of Patents